(12) United States Patent
Pace

(10) Patent No.: US 8,964,835 B2
(45) Date of Patent: Feb. 24, 2015

(54) FEATURE-BASED VIDEO COMPRESSION

(75) Inventor: Charles P. Pace, North Chittenden, VT (US)

(73) Assignee: Euclid Discoveries, LLC, Concord, MA (US)

(*) Notice: Subject to any disclaimer, the term of this patent is extended or adjusted under 35 U.S.C. 154(b) by 706 days.

(21) Appl. No.: 13/341,482

(22) Filed: Dec. 30, 2011

(65) Prior Publication Data

US 2012/0155536 A1  Jun. 21, 2012

Related U.S. Application Data

(63) Continuation of application No. 13/121,904, filed as application No. PCT/US2009/059653 on Oct. 6, 2009, and a continuation-in-part of application No. 12/522,322, filed on Jul. 7, 2009, now Pat. No.

(Continued)

(51) Int. Cl.
*H04N 7/12*     (2006.01)
*H04N 11/02*    (2006.01)
*H04N 11/04*    (2006.01)

(Continued)

(52) U.S. Cl.
CPC ............... *G06T 9/001* (2013.01); *H04N 19/17* (2014.11); *H04N 19/23* (2014.11); *H04N 19/543* (2014.11); *G06T 7/2006* (2013.01); *H04N 19/54* (2014.11)
USPC .................................................. 375/240.08

(58) Field of Classification Search
CPC ...... H04N 19/17; H04N 19/23; H04N 19/543
USPC .................................................. 375/240.08
See application file for complete search history.

(56) References Cited

U.S. PATENT DOCUMENTS 5,117,287 A * 5/1992 Koike et al. ................. 348/402.1
5,586,200 A * 12/1996 Devaney et al. .............. 382/232

(Continued)

FOREIGN PATENT DOCUMENTS

EP    0 614 318 A2    9/1994
EP    1 124 379 A2    8/2001

(Continued)

OTHER PUBLICATIONS

Jones, M. and P. Viola, "Fast Multi View Face Detection," *Mitsubishi Electrical Laboratories*, Jul. 2003 (10 pp.).

(Continued)

*Primary Examiner* — Jeremaiah C Hallenbeck-Huber
(74) *Attorney, Agent, or Firm* — Hamilton, Brook, Smith & Reynolds, P.C.

(57) ABSTRACT

Systems and methods of processing video data are provided. Video data having a series of video frames is received and processed. One or more instances of a candidate feature are detected in the video frames. The previously decoded video frames are processed to identify potential matches of the candidate feature. When a substantial amount of portions of previously decoded video frames include instances of the candidate feature, the instances of the candidate feature are aggregated into a set. The candidate feature set is used to create a feature-based model. The feature-based model includes a model of deformation variation and a model of appearance variation of instances of the candidate feature. The feature-based model compression efficiency is compared with the conventional video compression efficiency.

46 Claims, 8 Drawing Sheets

Related U.S. Application Data 8,908,766, application No. 13/341,482, which is a continuation-in-part of application No. 11/396,010, filed on Mar. 31, 2006, now Pat. No. 7,457,472, which is a continuation-in-part of application No. 11/336,366, filed on Jan. 20, 2006, now Pat. No. 7,436,981, which is a continuation-in-part of application No. 11/280,625, filed on Nov. 16, 2005, now Pat. No. 7,457,435, which is a continuation-in-part of application No. 11/230,686, filed on Sep. 20, 2005, now Pat. No. 7,426,285, which is a continuation-in-part of application No. 11/191,562, filed on Jul. 28, 2005, now Pat. No. 7,158,680.

(60) Provisional application No. 60/667,532, filed on Mar. 31, 2005, provisional application No. 60/670,951, filed on Apr. 13, 2005, provisional application No. 61/103,362, filed on Oct. 7, 2008, provisional application No. 60/881,966, filed on Jan. 23, 2007, provisional application No. 60/811,890, filed on Jun. 8, 2006.

(51) Int. Cl.
*G06T 9/00* (2006.01)
*H04N 19/17* (2014.01)
*H04N 19/23* (2014.01)
*H04N 19/543* (2014.01)
*G06T 7/20* (2006.01)
*H04N 19/54* (2014.01)

(56) References Cited

U.S. PATENT DOCUMENTS

| | | | |
|---|---|---|---|
| 5,710,590 A | 1/1998 | Ichige et al. | |
| 5,760,846 A | 6/1998 | Lee | |
| 5,774,591 A | 6/1998 | Black et al. | |
| 5,774,595 A | 6/1998 | Kim | |
| 5,826,165 A | 10/1998 | Echeita et al. | |
| 5,917,609 A | 6/1999 | Breeuwer et al. | |
| 5,933,535 A | 8/1999 | Lee et al. | |
| 5,969,755 A | 10/1999 | Courtney | |
| 5,991,447 A | 11/1999 | Eifrig et al. | |
| 6,044,168 A | 3/2000 | Tuceryan et al. | |
| 6,061,400 A | 5/2000 | Pearlstein et al. | |
| 6,088,484 A | 7/2000 | Mead | |
| 6,256,423 B1 | 7/2001 | Krishnamurthy et al. | |
| 6,307,964 B1 | 10/2001 | Lin et al. | |
| 6,546,117 B1 | 4/2003 | Sun et al. | |
| 6,574,353 B1 | 6/2003 | Schoepflin | |
| 6,608,935 B2 | 8/2003 | Nagumo et al. | |
| 6,611,628 B1 | 8/2003 | Sekiguchi et al. | |
| 6,614,466 B2 | 9/2003 | Thomas | |
| 6,625,310 B2 | 9/2003 | Lipton et al. | |
| 6,625,316 B1 | 9/2003 | Maeda | |
| 6,661,004 B2 | 12/2003 | Aumond et al. | |
| 6,711,278 B1 | 3/2004 | Gu et al. | |
| 6,731,799 B1 | 5/2004 | Sun et al. | |
| 6,731,813 B1 | 5/2004 | Stewart | |
| 6,738,424 B1 | 5/2004 | Allmen et al. | |
| 6,751,354 B2 | 6/2004 | Foote et al. | |
| 6,774,917 B1 | 8/2004 | Foote et al. | |
| 6,792,154 B1 | 9/2004 | Stewart | |
| 6,870,843 B1 | 3/2005 | Stewart | |
| 6,909,745 B1 | 6/2005 | Puri et al. | |
| 6,912,310 B1 | 6/2005 | Park et al. | |
| 6,925,122 B2 | 8/2005 | Gorodnichy | |
| 6,950,123 B2 | 9/2005 | Martins | |
| 7,003,117 B2 | 2/2006 | Kacker et al. | |
| 7,027,599 B1 | 4/2006 | Entwistle | |
| 7,043,058 B2 | 5/2006 | Cornog et al. | |
| 7,088,845 B2 | 8/2006 | Gu et al. | |
| 7,158,680 B2 | 1/2007 | Pace | |
| 7,162,055 B2 | 1/2007 | Gu et al. | |
| 7,162,081 B2 | 1/2007 | Timor et al. | |
| 7,164,718 B2 * | 1/2007 | Maziere et al. | 375/240.16 |
| 7,173,925 B1 | 2/2007 | Dantu et al. | |
| 7,184,073 B2 | 2/2007 | Varadarajan et al. | |
| 7,352,386 B1 | 4/2008 | Shum et al. | |
| 7,356,082 B1 | 4/2008 | Kuhn | |
| 7,415,527 B2 | 8/2008 | Varadarajan et al. | |
| 7,424,157 B2 | 9/2008 | Pace | |
| 7,424,164 B2 | 9/2008 | Gondek et al. | |
| 7,426,285 B2 | 9/2008 | Pace | |
| 7,436,981 B2 | 10/2008 | Pace | |
| 7,457,435 B2 | 11/2008 | Pace | |
| 7,457,472 B2 | 11/2008 | Pace et al. | |
| 7,508,990 B2 | 3/2009 | Pace | |
| 7,574,406 B2 | 8/2009 | Varadarajan et al. | |
| 7,606,305 B1 | 10/2009 | Rault | |
| 7,630,522 B2 | 12/2009 | Popp et al. | |
| 7,715,597 B2 | 5/2010 | Costache et al. | |
| 7,788,191 B2 | 8/2010 | Jebara | |
| 8,019,170 B2 | 9/2011 | Wang et al. | |
| 8,036,464 B2 | 10/2011 | Sridhar et al. | |
| 8,065,302 B2 | 11/2011 | Sridhar et al. | |
| 8,068,677 B2 | 11/2011 | Varadarajan et al. | |
| 8,086,692 B2 | 12/2011 | Sridhar et al. | |
| 8,090,670 B2 | 1/2012 | Sridhar et al. | |
| 8,140,550 B2 | 3/2012 | Varadarajan et al. | |
| 8,243,118 B2 | 8/2012 | Pace | |
| 8,259,794 B2 | 9/2012 | Bronstein et al. | |
| 8,290,038 B1 | 10/2012 | Wang et al. | |
| 8,902,971 B2 | 12/2014 | Pace et al. | |
| 2001/0038714 A1 | 11/2001 | Masumoto et al. | |
| 2002/0016873 A1 | 2/2002 | Gray et al. | |
| 2002/0054047 A1 | 5/2002 | Toyama et al. | |
| 2002/0059643 A1 | 5/2002 | Kitamura et al. | |
| 2002/0073109 A1 | 6/2002 | Toriumi | |
| 2002/0085633 A1 | 7/2002 | Kim et al. | |
| 2002/0114392 A1 | 8/2002 | Sekiguchi et al. | |
| 2002/0116529 A1 | 8/2002 | Hayden | |
| 2002/0164068 A1 | 11/2002 | Yan | |
| 2002/0196328 A1 | 12/2002 | Piotrowski | |
| 2003/0011589 A1 | 1/2003 | Desbrun et al. | |
| 2003/0058943 A1 | 3/2003 | Zakhor et al. | |
| 2003/0063778 A1 | 4/2003 | Rowe et al. | |
| 2003/0103647 A1 | 6/2003 | Rui et al. | |
| 2003/0112243 A1 | 6/2003 | Garg et al. | |
| 2003/0122966 A1 | 7/2003 | Markman et al. | |
| 2003/0163690 A1 | 8/2003 | Stewart | |
| 2003/0194134 A1 | 10/2003 | Wenzel et al. | |
| 2003/0195977 A1 | 10/2003 | Liu et al. | |
| 2003/0206589 A1 | 11/2003 | Jeon | |
| 2003/0231769 A1 | 12/2003 | Bolle et al. | |
| 2003/0235341 A1 | 12/2003 | Gokturk et al. | |
| 2004/0013286 A1 | 1/2004 | Viola et al. | |
| 2004/0017852 A1 | 1/2004 | Garrido et al. | |
| 2004/0022320 A1 | 2/2004 | Kawada et al. | |
| 2004/0028139 A1 | 2/2004 | Zaccarin et al. | |
| 2004/0085315 A1 | 5/2004 | Duan et al. | |
| 2004/0107079 A1 | 6/2004 | MacAuslan | |
| 2004/0113933 A1 | 6/2004 | Guier | |
| 2004/0135788 A1 | 7/2004 | Davidson et al. | |
| 2004/0246336 A1 | 12/2004 | Kelly, III et al. | |
| 2004/0264574 A1 | 12/2004 | Lainema | |
| 2005/0015259 A1 | 1/2005 | Thumpudi et al. | |
| 2005/0128306 A1 | 6/2005 | Porter et al. | |
| 2005/0185823 A1 | 8/2005 | Brown et al. | |
| 2005/0193311 A1 | 9/2005 | Das et al. | |
| 2006/0013450 A1 * | 1/2006 | Shan et al. | 382/123 |
| 2006/0029253 A1 | 2/2006 | Pace | |
| 2006/0045185 A1 | 3/2006 | Kiryati | |
| 2006/0067585 A1 | 3/2006 | Pace | |
| 2006/0120571 A1 | 6/2006 | Tu et al. | |
| 2006/0133681 A1 | 6/2006 | Pace | |
| 2006/0177140 A1 | 8/2006 | Pace | |
| 2006/0233448 A1 | 10/2006 | Pace et al. | |
| 2006/0274949 A1 | 12/2006 | Gallagher et al. | |
| 2007/0025373 A1 | 2/2007 | Stewart | |
| 2007/0071100 A1 | 3/2007 | Shi et al. | |
| 2007/0071336 A1 | 3/2007 | Pace | |
| 2007/0153025 A1 | 7/2007 | Mitchell et al. | |

(56) References Cited

U.S. PATENT DOCUMENTS

| | | |
|---|---|---|
| 2007/0183661 A1 | 8/2007 | El-Maleh et al. |
| 2007/0185946 A1 | 8/2007 | Basri et al. |
| 2007/0268964 A1 | 11/2007 | Zhao |
| 2008/0027917 A1 | 1/2008 | Mukherjee et al. |
| 2008/0040375 A1 | 2/2008 | Vo et al. |
| 2008/0101652 A1 | 5/2008 | Zhao et al. |
| 2008/0152008 A1 | 6/2008 | Sun et al. |
| 2008/0232477 A1* | 9/2008 | Wang et al. ............. 375/240.24 |
| 2008/0240247 A1 | 10/2008 | Lee et al. |
| 2009/0040367 A1 | 2/2009 | Zakrzewski et al. |
| 2009/0055417 A1 | 2/2009 | Hannuksela |
| 2009/0067719 A1 | 3/2009 | Sridhar et al. |
| 2009/0080855 A1 | 3/2009 | Senftner et al. |
| 2009/0112905 A1 | 4/2009 | Mukerjee et al. |
| 2009/0129474 A1 | 5/2009 | Pandit et al. |
| 2009/0158370 A1 | 6/2009 | Li et al. |
| 2009/0262804 A1 | 10/2009 | Pandit et al. |
| 2009/0292644 A1 | 11/2009 | Varadarajan et al. |
| 2010/0008424 A1 | 1/2010 | Pace |
| 2010/0027861 A1 | 2/2010 | Shekhar et al. |
| 2010/0049739 A1 | 2/2010 | Varadarajan et al. |
| 2010/0073458 A1 | 3/2010 | Pace |
| 2010/0074600 A1 | 3/2010 | Putterman et al. |
| 2010/0086062 A1 | 4/2010 | Pace |
| 2010/0088717 A1 | 4/2010 | Candelore et al. |
| 2010/0135590 A1 | 6/2010 | Yang et al. |
| 2010/0167709 A1 | 7/2010 | Varadarajan |
| 2010/0272185 A1 | 10/2010 | Gao et al. |
| 2010/0278275 A1 | 11/2010 | Yang et al. |
| 2010/0316131 A1 | 12/2010 | Shanableh et al. |
| 2010/0322300 A1 | 12/2010 | Li et al. |
| 2010/0322309 A1 | 12/2010 | Huang et al. |
| 2011/0019026 A1 | 1/2011 | Kameyama |
| 2011/0055266 A1 | 3/2011 | Varadarajan et al. |
| 2011/0058609 A1 | 3/2011 | Chaudhury et al. |
| 2011/0087703 A1 | 4/2011 | Varadarajan et al. |
| 2011/0182352 A1 | 7/2011 | Pace |
| 2011/0221865 A1 | 9/2011 | Hyndman |
| 2011/0285708 A1 | 11/2011 | Chen et al. |
| 2011/0286627 A1 | 11/2011 | Takacs et al. |
| 2012/0044226 A1 | 2/2012 | Singh et al. |
| 2012/0079004 A1 | 3/2012 | Herman |
| 2012/0105654 A1 | 5/2012 | Kwatra et al. |
| 2012/0163446 A1 | 6/2012 | Pace |
| 2012/0281063 A1 | 11/2012 | Pace |
| 2013/0027568 A1 | 1/2013 | Zou et al. |
| 2013/0035979 A1 | 2/2013 | Tenbrock |
| 2013/0083854 A1 | 4/2013 | Pace |
| 2013/0107948 A1 | 5/2013 | DeForest et al. |
| 2013/0170541 A1 | 7/2013 | Pace et al. |
| 2013/0230099 A1 | 9/2013 | DeForest et al. |

FOREIGN PATENT DOCUMENTS

| | | |
|---|---|---|
| EP | 1 426 898 A2 | 6/2004 |
| EP | 1 779 294 A2 | 5/2007 |
| JP | 2003-253190 | 11/1991 |
| JP | 5-244585 A | 9/1993 |
| JP | 07-038873 | 2/1995 |
| JP | 2007-095587 | 4/1995 |
| JP | 07-288789 | 10/1995 |
| JP | 08-235383 | 9/1996 |
| JP | 08-263623 | 10/1996 |
| JP | 2001-100731 A | 4/2001 |
| JP | 2001-103493 A | 4/2001 |
| JP | 2002-525735 T | 8/2002 |
| JP | 2004-94917 A | 3/2004 |
| JP | 2004 356747 | 12/2004 |
| JP | 2006-521048 A | 9/2006 |
| TW | 200521885 | 7/2005 |
| TW | 200527327 | 8/2005 |
| WO | WO 98/27515 | 6/1998 |
| WO | WO 98/59497 A1 | 12/1998 |
| WO | WO 99/26415 | 5/1999 |
| WO | WO 00/16563 | 3/2000 |
| WO | WO 00/45600 | 8/2000 |
| WO | WO02 102084 A1 | 12/2002 |
| WO | WO 03/041396 A1 | 5/2003 |
| WO | WO 2005/055602 A1 | 6/2005 |
| WO | WO 2005/107116 A2 | 11/2005 |
| WO | WO 2006/015092 A2 | 2/2006 |
| WO | WO 2006/034308 A2 | 3/2006 |
| WO | WO 2006/055512 A2 | 5/2006 |
| WO | WO 2006/083567 A1 | 8/2006 |
| WO | WO 2006/105470 A1 | 10/2006 |
| WO | WO 2007/007257 A1 | 1/2007 |
| WO | WO 2007/146102 A2 | 12/2007 |
| WO | WO 2008/091483 A2 | 7/2008 |
| WO | WO 2008/091484 A2 | 7/2008 |
| WO | WO 2008/091485 A2 | 7/2008 |
| WO | WO 2010/042486 A1 | 4/2010 |
| WO | WO 2010/118254 | 10/2010 |
| WO | WO 2011/156250 A1 | 12/2011 |
| WO | WO 2012/033970 A1 | 3/2012 |

OTHER PUBLICATIONS

Viola, P. and M. Jones, "Rapid Object Detection using a Boosted Cascade of Simple Features," *Proceedings of the 2001 IEEE Computer Society Conference on Computer Vision and Pattern Recognition*, 2001, vol. 1, pp. 511 518.

Gunsel, B. et al., "Content based access to video objects: Temporal segmentation, visual summarization, and feature extraction," *Signal Processing*, vol. 66, pp. 261 280 (1998).

Piamsa nga, P. and N. Babaguchi, "Motion estimation and detection of complex object by analyzing resampled movements of parts," in *Proc. ICIP '04*, 1 (365 368), Oct. 2004.

Vidal, R. et al., "Generalized principal component analysis (GPCA)", in *Proc. CVPR '03*, 1 (I621-628), Jun. 2003.

Vidal, R. and R. Hartley, "Motion segmentation with missing data using PowerFactorization and GPCA," in *Proc. CVPR 04*, 2 (II-310-316), Jun.-Jul. 2004.

Huang, R. et al., "Sparse representation of images with hybrid linear models," in *Proc. ICIP '04*, 2(1281 1284) Oct. 2004.

Rong, S. et al., "Efficient spatiotemporal segmentation and video object generation for highway surveillance video," in *Proc. IEEE Int'l, Conf. Communications, Circuits and Systems and West Sino Expositions*, 1(580 584), Jun. Jul. 2002.

Toklu, C. et al., "Simultaneous Alpha Map Generation and 2 D Mesh Tracking for Multimedia Applications," *Proceedings of the International Conference on Image Processing: 1997*, (113 116) (Oct. 1997).

Urban, M., "Harris Interest Operator," Jan. 28, 2003, hap://cmp.felk.cvut.cz/cmp/courses/dzo/resources/lecture_harris_urban.pdf (23 pp.).

Rehg, J. M. and Witkin, A. P., "Visual Tracking with Deformation Models," *Proc. IEEE Int 'l. Conf. on Robotics and Automation*, pp. 844-850 (Apr. 1991).

Kass, Michael, Andrew Witzin, and Demetri Terzopoulos, "Snakes: Active contour Models," *International Journal of Computer Vision* (1988).

Tao, H., et al., "Compression of MPEG-4 Facial Animation Parameters for Transmission of Talking Heads," *IEEE Transactions on Circuits and Systems for Video Technology*, vol. 9, No. 2, pp. 264-276 (Mar. 1999).

Reinders, M.J.T., et al., "Facial Feature Localization and Adaptation of a Generic Face Model for model-Based Coding," *Signal Processing: Image Communication*, No. 7, pp. 57-74 (1995).

Doenges, P. K., "MPEG-4: Audio/Video and Synthetic Graphics/ Audio for Mixed Media," *Signal Processing: Image Communication*, No. 9, pp. 433-463 (1997).

PCT International Search Report, for International Application No. PCT/US2008/000091, dated Sep. 23, 2008, 5 pages.

PCT International Search Report, for International Application No. PCT/US2008/000092, dated Sep. 23, 2008, 5 pages.

Antoszczyszyn, P.M., et al., "Tracking of the Motion of Important Facial Features in Model-Based Coding," *Signal Processing*, 66(2):249-260, (Apr. 30, 1998).

(56) References Cited

OTHER PUBLICATIONS

Fukuhara, T., et al., "3-D Motion Estimation of Human Head for Model-Based Image Coding," *IEEE Proceedings-I*, 140(1):26-35, (Feb. 1, 1993).
International Search Report for International Application No. PCT/US2009/059653, 8 pp., mailed Feb. 2, 2010.
Written Opinion of the International Searching Authority for International Application No. PCT/US2009/059653, 8 pp., mailed Feb. 2, 2010.
Notification of Transmittal of the International Search Report and the Written Opinion of the International Searching Authority, or the Declaration, for International Application No. PCT/US2008/000090, 19 pp., mailed Aug. 18, 2010.
Invitation to Pay Additional Fees and, Where Applicable, Protest Fee, for International Application No. PCT/US2008/000090, mailed Jun. 2, 2010.
Notification Concerning Transmittal of International Preliminary Report on Patentability (Chapter I of the Patent Cooperation Treaty), for International Application No. PCT/TJS2008/00090, mailed Sep. 2, 2010.
Amit, Yali, *2D Object Detection and Recognition: Models, Algorithms, and Networks*, The MIT Press, Cambridge, Massachusetts, pp. 147-149 (Sections 7.3: Detecting Pose and 7.4: Bibliographical Notes and Discussion) (2002).
Huang, T.S. et al., "Chapter 5: Three-Dimensional Model-Based Image Communication," *Visual Information Representation, Communication, and Image Processing*, Editors: Chen, Chang Wen, et al., Marcel Dekker, Inc., New York, New York, pp. 97-117 (1999).
Extended European Search Report for 06 73 3758.4, dated Mar. 8, 2011 (17 pages).
Extended European Search Report for 06 74 0318.8, dated May 6, 2011 (14 pages).
Fischler, M.A., et al., "Random Sample Consensus: A Paradigm for Model Fitting with Applications to Image Analysis and Automated Cartography," Communications of the Association for Computing Machinery, 24(6):381-395 (1981).
Harris, C., et al., "A Combined Corner nad Edge Detector," Alvey Vision Conference, Proceedings of the Alvey Vision Conference, p. 147 (1988).
Irani, M., et al., "Detecting and Tracking Multiple Moving Objects Using Temporal Integration," European Conference on Computer Vision, 282-287 (1992).
Notification Concerning Transmittal of the International Preliminary Report on Patentability for PCT/US2009/059653, mailed Apr. 21, 2011 (10 pages).
Park, et al., "Qualitative Estimation of Camera Motion Parameters From the Linear Composition of Optical Flow," Pattern Recognition: The Journal of the Pattern Recognition Society, 37:767-779 (2004).
Pique, R. et al., "Efficient Face Coding in Video Sequences Combining Adaptive Principal Component Analysis and a Hybrid Codec Approach," Proceedings of International Conference on Acoustics, Speech and Signal Processing, 3:629-632(2003).
Schröder, K., et al., "Combined Description of Shape and Motion in an Object Based Coding Scheme Using Curved Triangles," Proceedings of the International Conference on Image Processing, 2:390-393 (1995).
Tabatabai, A. J., et al., "Motion Estimation Methods for Video Compression—A Review," Journal of the Franklin Institute, 335(8): 1411-1441 (1998).
Wang, Y., "Use of Two-Dimensional Deformable Mesh Structures for Video Coding, Part I—The Synthesis Problem: Mesh-Based Function Approximation and Mapping" IEEE Transactions on Circuits and Systems for Video Technology, 6(6):1051-8215 (1996).
Shin, J. et al., "Optical flow-based real-time object tracking using non-prior training active feature model," Academic Press Limited, GB, vol. 11, No. 3, pp. 204-218 (Jun. 1, 2005).
Cho, J-H., et al., "Object detection using multi-resolution mosaic in image sequences," Signal Processing. Image Communication, Elsevier Science Publishers, Amsterdam, vol. 20, No. 3, pp. 233-253, (Mar. 1, 2005).
Gorodinchy, et al., "Seeing faces in video by computers. Editorial for Special Issue on Face Processing in Video Sequences," Image and Vision Computing, Guilford, GB, vol. 24, No. 6, pp. 551-556 (Jun. 1, 2006).
Miners, B. W., et al., "Dynamic Facial Expression Recognition Using Fuzzy Hidden Markov Models," Systems, Man and Cybernetics, 2005 IEEE International Conference on, IEEE, Piscataway, N.J., USA, vol. 2, pp. 1417-1422 (Oct. 10, 2005).
"Bit-Torrent: Introduction", Retrieved on: Jan. 18, 2006, retrieved online at: http://web.archive.org/web/20060118042451/http://www.bittorrent.com/introduction.html.
Bay, H., et al., "SURF: Speeded Up Robust Features", ETH Zurich {bay, vangool}@vision.ee.ethz.ch, 1-14 (Date Not Provided).
Lowe, D.G., "Distinctive Image Features from Scale-Invariant Keypoints", International Journal of Computer Vision, 1-28 (2004).
Pati, Y.C., et al., "Orthogonal Matching Pursuit: Recursive Function Approximation with Applications to Wavelet Decomposition", 27th Annual Asilomar conference on Signals systems and Computers ,1-5 (1993).
Wiegand, T., et al., "Overview of the H.264/AVC Video Coding Standard", IEEE Transactions on Circuits and Systems for Video Technology, 13(7):560-576 (2003).
"Series H: Audiovisual and Multimedia Systems: Infrastructure of audiovisual services—Coding of moving video; Advanced video coding for generic audiovisual services", ITU-T, H.264: 1-657 (2012).
Garrett-Glaser, J., "Diary of an x264 Developer", http://x264dev.multimedia.cx/, 1-7 (2008).
Brenneman, A., et al., "x264", Wikipedia—The Free Encyclopedia: http://en.wikipedia,org/wiki/X264, 1-5 (Date Not Provided).
"H.264/MPEG-4 AVC", Wikipedia—The Free Encyclopedia: http://en.wikipedia,org/wiki/X264, 1-17 (Date Not Provided).
OpenCV Documentation Page, http://docs.opencv.org/ (Retrieved on Dec. 21, 2012).
Intel Integrated Performance Primitives—Documentation, http://software.intel.com/en-us/articles/intel-integrated-performance-primitives-documentation/ (Retrieved on Dec. 21, 2012).
Office Action from U.S. Appl. No. 13/341,437, dated Nov. 20, 2012.
Office Action from U.S. Appl. No. 12/522,357, dated Dec. 12, 2012.
Office Action from U.S. Appl. No. 12/522,322, dated Dec. 11, 2012.
Notification Concerning Transmittal of International Preliminary Report on Patentability, in International Application No. PCT/US2008/000092, pp. 9, mailed Aug. 6, 2009.
Dodgson, N. A., "Image resampling," Technical Report, UCAM-CL-TR-261, ISSN 1476-2986, University of Cambridge, Computer Laboratory, (264 pp.) (Aug. 1992).
Richardson, I., "Vcodex White Paper: Video Compression Patents," Vcodex Ltd., pp. 3-6 (2008-2011).
Notification Concerning Transmittal of International Preliminary Report on Patentability, in International Application No. PCT/US2008/000091, pp. 9, mailed Aug. 6, 2009.
Wang, Y., "Use of Two-Dimensional Deformable Mesh Strucutures for Video Coding, Part II—The Analysis Problem and a Region-Based Coder Employing an Active Mesh Representation" IEEE Transactions on Circuits and Systems for Video Technology, 6(6):1051-8215 (1996).
Viola, P. and Jones, M.J., "Robust Real-Time Face Detection," International Journal of Computer Vision, 20(17):138-153 (2004).
Jolliffe, I.T., "Principal Component Analysis, Second Edition," Springer, 518 pp., Apr. 2002.
Notification and Transmittal of International Search Report and Written Opinion dated Jun. 10, 2013 for PCT/US2013/029297, entitled "Video Compression Repository and Model Reuse".
Zhang, et al., "A Novel Video Coding Framework by Perceptual Representation and Macroblock-Based Matching Pursuit Algorithm", *Department of Computer Science and Technology*, pp. 322-331 (2007).
Osama, et al., "Video Compression Using Matching Pursuits", *IEEE Transactions on Circuits and Systems for Video Technology*, vol. 9, No. 1, Feb. 1999.
Neff, et al., "Matching-Pursuit Based Video Compression", *Department of Electrical Engineering and Computer Science*, MPEG Meeting, Mar. 11, 1995.

(56) References Cited

OTHER PUBLICATIONS

Office Action from U.S. Appl. No. 13/121,904, dated May 29, 2013.
Ebrahimi, T., et al. "MPEG-4 natural video coding—An Overview", Signal Processing: Image Communication 15:365-385 (2000).
Keysers, et al., "Deformation Models for Image Recognition," IEEE Transactions on Pattern Analysis and Machine Intelligence, 29(8):1422-1435 (2007).
Notice of Allowance, U.S. Appl. No. 13/121,904, dated Jul. 25, 2014.
Notice of Allowance, U.S. Appl. No. 13/121,904, dated Nov. 4, 2014.
Notification Concerning Transmittal of International Preliminary Report on Patentability, PCT/US2013/025123, "Video Compression Repository and Model Reuse," date of mailing Oct. 1, 2014.
Notification Concerning Transmittal of International Preliminary Report on Patentability, PCT/US2013/025123, "Context Based Video Encoding and Decoding," date of mailing Oct. 9, 2014.

* cited by examiner

FEATURE-BASED VIDEO COMPRESSION

RELATED APPLICATIONS

This application is a continuation U.S. application Ser. No. 13/121,904, filed Mar. 30, 2011, which is the U.S. National Stage of International Application No. PCT/US2009/059653, filed 6 Oct. 2009, which designates the U.S. and published in English, which claims the benefit of U.S. Provisional Application No. 61/103,362, filed 7 Oct. 2008 and is also a continuation-in-part of Ser. No. 12/522,322, filed Jul. 7, 2009 now U.S. Pat. No. 8,908,766, which claims the benefit of U.S. Provisional Application No. 60/881,966, filed Jan. 23, 2007, is related to U.S. Provisional Application No. 60/811,890, filed Jun. 8, 2006, and is a continuation-in-part of U.S. application Ser. No. 11/396,010, filed Mar. 31, 2006 now U.S. Pat. No. 7,457,472, which is a continuation-in-part of U.S. application Ser. No. 11/336,366 filed Jan. 20, 2006 now U.S. Pat. No. 7,436,981, which is a continuation-in-part of U.S. application Ser. No. 11/280,625 filed Nov. 16, 2005 now U.S. Pat. No. 7,457,435 which is a continuation-in-part of U.S. application Ser. No. 11/230,686 filed Sep. 20, 2005 now U.S. Pat. No. 7,426,285 which is a continuation-in-part of U.S. application Ser. No. 11/191,562 filed Jul. 28, 2005, now U.S. Pat. No. 7,158,680. U.S. application Ser. No. 11/396,010 also claims priority to U.S. Provisional Application No. 60/667,532, filed Mar. 31, 2005 and U.S. Provisional Application No. 60/670,951, filed Apr. 13, 2005.

The entire teachings of the above applications are incorporated herein by reference.

BACKGROUND OF THE INVENTION

Prediction Segmentation [Primary]

Conventional video compression, for example MPEG-4 and H.264, have the facilities for specifying a number of reference frames to use during the motion compensated prediction process in order to predict the current frame. These standards typically restrict the reference frames to one or more consecutive past frames, and in some cases any set of frames that has been previously decoded. Usually, there is a limit on the number of reference frames and also a limit on how far back in the stream of decoded frames the selection process may draw.

Compressed Sensing (CS)

Image and video compression techniques generally attempt to exploit redundancy in the data that allows the most important information in the data to be captured in a "small" number of parameters. "Small" is defined relative to the size of the original raw data. It is not known in advance which parameters will be important for a given data set. Because of this, conventional image/video compression techniques compute (or measure) a relatively large number of parameters before selecting those that will yield the most compact encoding. For example, the JPEG and JPEG 2000 image compression standards are based on linear transforms (typically the discrete cosine transform [DCT] or discrete wavelet transform [DWT]) that convert image pixels into transform coefficients, resulting in a number of transform coefficients equal to the number of original pixels. In transform space, the important coefficients can then be selected by various techniques. One example is scalar quantization. When taken to an extreme, this is equivalent to magnitude thresholding. While the DCT and DWT can be computed efficiently, the need to compute the full transform before data reduction causes inefficiency. The computation requires a number of measurements equal to the size of the input data for these two transforms. This characteristic of conventional image/video compression techniques makes them impractical for use when high computational efficiency is required.

Conventional compression allows for the blending of multiple matches from multiple frames to predict regions of the current frame. The blending is often linear, or a log scaled linear combination of the matches. One example of when this bi-prediction method is effective is when there is a fade from one image to another over time. The process of fading is a linear blending of two images, and the process can sometimes be effectively modeled using bi-prediction. Further, the MPEG-2 Interpolative mode allows for the interpolation of linear parameters to synthesize the bi-prediction model over many frames.

Conventional compression allows for the specification of one or more reference frames from which predictions for the encoding of the current frame can be drawn. While the reference frames are typically temporally adjacent to the current frame, there is also accommodation for the specification of reference frames from outside the set of the temporally adjacent frames.

In contrast with conventional transform-based image/video compression algorithms, compressed sensing (CS) algorithms directly exploit much of the redundancy in the data during the measurement ("sensing") step. Redundancy in the temporal, spatial, and spectral domains is a major contributor to higher compression rates. The key result for all compressed sensing algorithms is that a compressible signal can be sensed with a relatively small number of random measurements and much smaller than the number required by conventional compression algorithms. The images can then be reconstructed accurately and reliably. Given known statistical characteristics, a subset of the visual information is used to infer the rest of the data.

The precise number of measurements required in a given CS algorithm depends on the type of signal as well as the "recovery algorithm" that reconstructs the signal from the measurements (coefficients). Note that the number of measurements required by a CS algorithm to reconstruct signals with some certainty is not directly related to the computational complexity of the algorithm. For example, a class of CS algorithms that uses L1-minimization to recover the signal requires a relatively small number of measurements, but the L1-minimization algorithm is very slow (not real-time). Thus, practical compressed sensing algorithms seek to balance the number of required measurements with the accuracy of the reconstruction and with computational complexity. CS provides a radically different model of codec design compared to conventional codecs.

In general, there are three major steps in a typical CS algorithm: (1) create the measurement matrix M; (2) take measurements of the data using the measurement matrix, also known as creating an encoding of the data; and (3) recover the original data from the encoding, also known as the decoding step. The recovery algorithm (decoder) can be complex, and because there are fewer limits to computational power at the receiver, the overall CS algorithm is usually named after its decoder. There are three practical applications of CS algorithms of interest in the prior art: Orthogonal Matching Pursuit (OMP), L1 Minimization (L1M), and Chaining Pursuit (CP). In general, the L1M in practice is prohibitively computationally inefficient for most video processing applications. The more efficient OMP and CP algorithms provide much of the same benefits of the L1M, and, as such, they are the two CS algorithms of choice for most applications of the L1M.

Image Alignment Via Inverse Compositional Algorithm

Basri and Jacobs ("Lambertian Reflectances and Linear Subspaces," IEEE Trans. Pattern Analysis and Machine Intelligence, February 2003), henceforth referred to as LRLS, have shown that Lambertian objects (whose surfaces reflect light in all directions) can be well-approximated by a small (9-dimensional) linear subspace of LRLS "basis images" based on spherical harmonic functions. The LRLS basis images can be visualized as versions of the object under different lighting conditions and textures. The LRLS basis images thus depend on the structure of the object (through its surface normals), the albedo of the object at its different reflection points, and the illumination model (which follows Lambert's cosine law, integrated over direction, to produce spherical harmonic functions). Under the assumptions of the model, the 9-D subspace captures more than 99% of the energy intensity in the object image. The low dimensionality of the appearance subspace indicates a greater redundancy in the data than is available to conventional compression schemes.

The inverse compositional algorithm (IC) was first proposed as an efficient implementation of the Lucas-Kanade algorithm for 2D motion estimation and image registration. Subsequent implementations have used the IC algorithm to fit 3D models such as Active Appearance Models and the 3D morphable model (3DMM) to face images.

Application of Incremental Singular Value Decomposition (ISVD) Algorithm

A common dimensionality reduction technique involves the utilization of linear transformations on norm preserving bases. Reduction of an SVD representation refers to the deletion of certain singular value/singular vector pairs in the SVD to produce a more computationally and representationally efficient representation of the data. Most commonly, the SVD factorization is effectively reduced by zeroing all singular values below a certain threshold and deleting the corresponding singular vectors. This magnitude thresholding results in a reduced SVD with r singular values (r<N) that is the best r-dimensional approximation of the data matrix D from an L2-norm perspective. The reduced SVD is given by $$\hat{D} = U_T S_T V_T^T,$$  Equation 1 where Ur is M×r, Sr is r×r diagonal, and Vr is N×r.

The singular value decomposition (SVD) is a factorization of a data matrix that leads naturally to minimal (compact) descriptions of the data. Given a data matrix D of size M×N, the SVD factorization is given by D=U*S*V' where U is an M×N column-orthogonal matrix of (left) singular vectors, S is an N×N diagonal matrix with singular values (s1, s2, ... sN) along the diagonal, and V is an N×N orthogonal matrix of (right) singular vectors.

Compact Manifold Prediction

Matching pursuit (MP) is an iterative algorithm for deriving efficient signal representations. Given the problem of representing a signal vector s in terms of a dictionary D of basis functions (not necessarily orthogonal), MP selects functions for the representation via the iterative process described here. The first basis function in the representation (denoted as d1) is selected as the one having maximum correlation with the signal vector. Next, a residual vector r1 is computed by subtracting the projection of d1 onto the signal from the signal itself: r1=s−(d1'*s)*d1. Then, the next function in the representation (d2) is selected as the one having maximum correlation with the residual r1. The projection of d2 onto r1 is subtracted from r1 to form another residual r2. The same process is then repeated until the norm of the residual falls below a certain threshold.

Orthogonal matching pursuit (OMP) follows the same iterative procedure as MP, except that an extra step is taken to ensure that the residual is orthogonal to every function already in the representation ensemble. While the OMP recursion is more complicated than in MP, the extra computations ensure that OMP converges to a solution in no more than Nd steps, where Nd is the number of functions in the dictionary D.

SUMMARY OF THE INVENTION

The present invention extends conventional video compression, especially in cases where the redundancy of visual phenomena exceeds the modeling capabilities of the conventional video codec. The present invention extends, and may entirely replace, the existing methods of conventional video compression by employing robust Computer Vision and Pattern Recognition algorithms. Specifically, the present invention includes feature modeling methods and systems that focus on the segmentation, normalization, and integration of a feature occurring in one or more of the previously decoded frames of the video. Feature-based video compression considers a greater number of previously decoded frames, and within each of those frames, a greater area and a much higher number of pels compared with conventional compression which considers fewer frames, smaller areas, and fewer pels.

Conventional compression provides an implicit form of segmentation at the macroblock level, by utilizing multiple reference frames, macroblock partitioning, sub-macroblock partitioning, and motion compensated prediction. Further, conventional compression utilizes motion compensated prediction to model the spatial deformation occurring in the video and transform coding to model the appearance variations. The present invention extends these modeling techniques of disparate signal elements with more complex models including spatial segmentation masks, regular mesh deformation, feature affine motion, three dimensional feature motion, three dimensional illumination, and other Computer Vision and Pattern Recognition modeling techniques. Note that throughout the present text, "individual modes" and "disparate signal elements" are equivalent.

The present invention facilitates the identification and segmentation of individual modes of the video signal. The concept of reference frame processing that is used in conventional motion compensated prediction is utilized in the present invention to facilitate this identification and segmentation. The conventional motion compensated prediction process selects, at the macroblock level, portions of the signal from one or more reference frames. Note that the conventional motion compensated prediction process typically does such a selection based on some rate-distortion metric. The present invention is able to apply analysis to the past frames to determine the frames that will have the highest probability of providing matches for the current frame. Additionally, the number of reference frames can be much greater than the typical one to sixteen reference frame maximum found in conventional compression. Depending on system resources, the reference frames may number up to the limit of system memory; assuming that there are a sufficient number of useful matches in those frames. Further, the intermediate form of the data generated by the present invention can reduce the required amount of memory for storing the same number of reference frames.

In one embodiment, the present invention infers the segmentation of the video signal based on this reference frame processing. The macroblocks (block of pixels) in the current frame may select, through the motion compensated prediction process, tiles of pels from previously decoded frames such that those tiles are separated both spatially and also temporally, meaning that the source of tiles used in the motion compensated prediction process may come from different frames. The separation implied by selection of source tiles, for predicting current frame macroblocks, from different frames indicates the potential that different signal modes are being identified. When the identified separate signal modes can be encoded in a more compact manner, this further verifies that separate modes have been identified. In the present invention these separate modes are called "features." When these features are persistent over many frames of the video and the features can be correlated, a new type of redundancy in the video has been identified. The present invention leverages this redundancy through the creation of appearance and deformation models in order to create further compression beyond what is available to conventional compression. Further, as features are identified within reference frames, reference frame processing is biased toward using reference frames containing features; this yields an increased probability that the reference frame processing will further yield a segmentation of the modes present in the signal.

Systems and methods may be provided for processing video data. Video data formed of a series of video frames may be received and encoded. One or more instances of a candidate feature may be detected in one or more of the video frames. The detection of the candidate feature involves determining positional information for instances in the one or more previously decoded video frames. The positional information includes a frame number, a position within that frame, and a spatial perimeter of the instance. The candidate feature can be a set of one or more detected instances. A motion compensated prediction process can be used to predict a portion of a current video frame in the series using one or more previously decoded video frames. The motion compensated prediction process can be initialized with positional predictions. The positional predictions can provide positional information from detected feature instances in previously decoded video frames. One or more of the instances can be transformed by augmenting the motion compensated prediction process. A feature along with the transformed instances can be defined. The one or more of the instances may be transformed using a linear transform. The defined feature including the transformed instances can be used to create a first feature-based model. The first feature-based model can enable prediction in the current frame of an appearance and a source position of a substantially matching feature instance. Preferably, the substantially matching feature is the best match determined using a rate-distortion metric. The substantially matching feature instance can be a key feature instance. The key feature instance can be the first feature-based model current frame feature instance synthesis. The first feature-based model can be compared to a conventional video encoding model of the one or more defined features, and the comparison can be used to determine which model enables greater encoding compression. The results of the comparing and determining step can be used to guide the encoding process in applying feature-based encoding to portions of one or more of the video frames, and applying conventional video encoding to other portions of the one or more video frames.

An instance of a candidate feature can be detected by identifying a spatially continuous group of pels having substantially close spatial proximity. The identified pels can be used to define a portion of one of the one or more video frames. The group of pels can include one or more macroblock or portions of one or more macroblocks.

The motion compensated prediction process can be used to select, from a plurality of candidate feature instances, one or more instances that are predicted to provide encoding efficiency. A segmentation of the current instance of the candidate feature can be determined from other features and non-features in the current video frame. The segmentation can be based on the motion compensated prediction process' selection of predictions from unique previously decoded video frames. The motion compensated prediction process can be initialized using positional information for feature instances belonging to one or more features (such features having instances in the current frame coincident with the video portion) where the video portion is in the current frame, and the positional information corresponds to feature instances associated with the same feature in previously decoded video frames.

A second feature-based model can be formed. The second feature-based model can be formed using the first feature-based model as a target of prediction for one or more motion compensated predictions from one or more feature instance. This second feature-based model yields a set of predictions of the first feature-based model. Once the set of predictions is combined with the first feature-based model, the set of predictions can become the second feature-based model. The second feature-based model can be used to model the residual from first feature-based model. Structural variation and appearance variation can be modeled from the second-feature based model relative to the residual. The residual can be encoded with the feature instance, which yields appearance and deformation parameters. The parameters can be used to reduce the encoding size of the residual.

One or more features can include one or more aggregate features. The aggregate features are based on one or more of the instances of the candidate feature. The aggregate features can be created by aggregating the instances of different candidate features into an aggregate candidate feature. The set of instances of the aggregate candidate features can be used to form a region substantially larger than the original instances of un-aggregated candidate features. The larger region can be formed through the identification of coherency among the instances of the candidate feature in the set. Coherency can be defined as appearance correspondences in the instances substantially approximated by a lower parameter motion model. The second feature-based model can provide an optional rectangular area extent of pels associated with that instance in the decoded frame relative to the spatial position. The second feature-model can be derived by modeling prior normalized instances of the feature. The prior normalized instances can be any one of the following: the instance in the current frame; an instance that is from a previously decoded frame that is substantially recent temporally; or an average of the instances from the previously decoded video frames.

The appearance model can be represented by a PCA decomposition of the normalized second feature-based model instances. A deformation model can be determined using the spatial variation of correspondences in the feature instances of each set as compared to their second feature-based model instances. For each feature instance in the set, one or more of the following can be used to approximate variation in the deformation instances for the deformation model: a motion compensated prediction process; mesh deformation; and a motion model with a substantially reduced parameterization. The deformation instances can be integrated into the deformation model. The variation in the deformation model can be represented by a PCA decomposition.

Appearance parameters and deformation parameters may be predicted. The predicated parameters can be used during the synthesis of the current instance using a feature-based model. The appearance and deformation models as well as temporally recent parameters can be used to interpolate and extrapolate parameters from the feature-based model to predict pels in the current frame. The values of the synthesis for the temporally recent feature instances may be either linearly interpolated or linearly extrapolated based on which method has yielded the most accurate approximation for those instances. The actual parameters for the model can be optionally differentially encoded relative to the predicted parameters.

The motion compensated prediction process can operate on a selection of a substantially larger number of the previously decoded video frames than in conventional video data encoding. The selection of previously decoded video frames need not rely on user supervision.

Conventional video encoding can be augmented by an instance prediction process that enables greater compression of portions of one or more of the video frames in memory, when forming a prediction of portions of the current frame. The instance prediction process can use the feature-based model to determine one or more instances of the defined feature that are incident to a target macroblock being encoded. In this way, the instance prediction process can create the predicted portions of the current frame. The feature-based model can be used to synthesize pels to predict portions of the current frame.

A probability for the previously decoded video frames can be assigned. The probability can be based on the combined predicted encoding performance improvement for the frame, determined using positional predictions from the motion compensated prediction process. The probability can be defined as the combined encoding performance of motion compensated prediction process, which was utilized during the analysis of the first feature-based model and a second feature-based model for the current frame. An indexing based on sorting the previously decoded video frames can be created based on their probability, from best to worst. The indexed list can be truncated based on computational and memory requirements.

A feature-based model may be formed using one or more of the defined features. The feature-based model may include positional information for the defined features. The positional information may include a position and a spatial perimeter of defined features from the previously decoded video frames. For example, the positional information may include information regarding the spatial position of region within a specific frame, and a rectangular extent of the region in that frame. The feature-based model may specify which previously decoded video frames (or portions thereof) are associated with the defined feature.

The defined features may be normalized and segmented from the video data using macroblock motion compensated prediction. The defined features may be normalized using the feature-based model. The macroblock motion compensated prediction may use the feature position in the previously decoded image frame as a positional prediction. The resulting normalization provides the prediction of the feature in the current video frame.

The feature-based model may be compared to another model resulting from conventional encoding of the same video data. The comparison can be used to determine which model enables greater encoding compression efficiency. Different encoding techniques may be applied to the different parts of the video data depending on the results of the encoding comparison. In this way, differential encoding can be provided such that the system is capable of selecting a different video encoding scheme for each portion of video data depending on whether feature-based encoding or conventional based encoding provides more compression efficiency.

A defined feature may be represented as a set of instances of the feature in one or more video frames. Each instance may include: a reference to a frame in which the instance occurs; a spatial position associated with the instance within that frame; and an optional rectangular area extent of pels associated with that instance in that frame relative to the spatial position. The spatial position may provide a prediction of matches for encoding portions of one or more of the video frames. An appearance model may be provided for each defined feature to model variation of the defined feature from instance to instance in the set. The appearance model may be derived by modeling prior normalized instances of the feature. The prior normalized instances may be normalized using any combination of motion compensated prediction process, mesh deformation, and parameter reduced motion modeling (e.g. affine).

The normalization can be used to build a deformation model that may be used to model the spatial variation of correspondences in the feature instances of each set. For each feature instance in the set, one or more of the following may be used to determine deformation instances for the deformation model: a motion compensated prediction process, mesh deformation, and parameter reduced motion modeling. The deformation instances may be integrated into the deformation model. The deformation model may be represented by a decomposition using Principal Component Analysis (PCA). The deformation model may be represented by a decomposition using any decomposing algorithm. The motion compensation prediction process may operate on a substantially greater number of the previously decoded video frames than in conventional video data encoding without supervision.

The conventional video encoding may include motion-compensated block-based compression. The conventional video encoding can be augmented by a residual reduction process that enables greater compression of portions of the video frames in memory when forming a residual frame. The residual reduction process can include the feature-based model to determine one or more instances of the defined feature that are incident to a target macroblock being encoded to form the residual frame. Pels may be synthesized using the feature-based models to predict the residual frame. The feature-based model may be used for reference frame index prediction. The synthesized pels may be reused for other residual reductions in response to determining that one or more instances of the defined feature, overlaps more than one macroblock in the current frame. The synthesized pels may be reused for other residual reductions in response to determining that one or more instances of the defined feature represents one macroblock when one or more instances of the defined feature substantially matches positional information for a macroblock in the current frame. Appearance and deformation may be modeled based on the feature-based model. The appearance model and deformation model may be used along with a historical set of parameters in those models to interpolate and extrapolate parameters from the feature-based model to predict pels in the current frame. Furthermore, higher order quadratic and even extended Kalman filter models can be used to predict the appearance and deformation parameters. The prediction of the parameters from the feature-based model enable a reduction in the magnitude of the residual parameters, resulting in a lower precision and therefore lower bit rate representation of the parameters required to predict pels in the current frame.

One or more macroblocks from one or more frames may be selected using the motion compensated prediction process. Pels from macroblocks in a PCA model may be linearly combined pels, and the PCA model parameters may be interpolated. Equivalently, any decomposing algorithm can be used in place of PCA, and utilized based on its substantially relative benefit.

Substantially small spatial regions may be identified in the video frames. Coherency criteria may be used to identify spatial regions that can be combined into substantially larger spatial regions. For a larger spatial region, the suitability of the larger spatial region to be a defined feature can be determined by encoding a feature-based model of the larger spatial region. The smaller region may be a defined feature, and the larger region may be a defined feature.

Feature-based compression can include object-based compression processes. Object based detection, tracking, and segmentation may be applied to a feature instance in the current frame or in previously decoded frames. An intermediate form of the feature instance may be derived using spatial segmentation. For example, the spatial segmentation process may segment a foreground object from the non-object background. The resulting segmentation may provide a pel level correspondence of a given object in a feature instance as it exists in one frame to its occurrence in a next frame. The pel data associated with the object is resampled, and subsequently the spatial positions of the resampled pel data are restored using models. The resampling effectively normalizes the object pel data from one frame to a next frame and results in providing an intermediate form of the video data which has computational and analytical advantages for video processing purposes. In this way, object-based normalization and modeling processes may be applied to a feature instance (or portions thereof) in the current frame or in previously decoded frames during the feature-based encoding process. Correspondence modeling, deformation modeling, appearance modeling, contour modeling, and structural modeling may be used to model a feature instance (or portions thereof) in the current frame or in previously decoded frames.

A defined feature may be free of correspondence to salient entities (object, sub-objects). For example, the salient entities may be determined through supervised labeling of detected features as belonging to or not belonging to an object. The defined features may contain elements of two or more salient objects, background, or other parts of the video frames. One or more features may constitute an object. Also, a defined feature may not correspond to an object. A defined feature may not included in any objects. In this way, feature-based compression can be more flexible and versatile than object-based detection. Although defined features can include objects and be included in objects, defined features do not need to be object-based and can take any form.

In another embodiment, Compressed Sensing (CS) is applied to the feature based encoding technique. CS is applied to pels in the video frames having working or defined features. CS may also be applied to conventional encoding to the remaining pels of the video frames. The video data may be made sparse to increase the effectiveness of the application of CS. During model formation (appearance and deformation models), CS may be applied to resolve the model parameters from partial parameter measurements.

CS can be applied to the residual of the second feature-based model prediction. The application of CS can utilize the average appearance as a measurement and predict the video signal from it. Variance associated with the CS prediction can be removed from the second feature-based model. The feature-based model can be used to focus on a more compact encoding of the remaining CS encoding can be applied to the remaining pels in the one or more video frames and to remaining video frames.

A hybrid codec decoder may be provided that uses feature-based decompression for decoding video data. Encoded video data may be decoded by determining on a macroblock level whether there is an encoded feature in the encoded video data. The encoded feature may include feature-based models. Where an encoded feature does not exist, macroblocks in the encoded video data may be decoded using conventional video decompression. Where an encoded feature does exist, the decoder may respond to the detection of an encoded feature in the encoded video data by separating the feature encoded parts from the encoded video data. By separating the feature encoded parts, the system is able to synthesize the encoded feature separately from the conventionally encoded parts in the video stream. Feature parameters from the encoded feature parts may be associated with feature models included with the encoded feature. The feature parameters may be used by the decoder to synthesize the encoded feature. The conventionally compressed parts/portions of the video data may be combined with the synthesized feature to reconstruct the original video frame.

In another embodiment, a video codec is capable of handling a plurality of compressed video signal modes. In one of the video signal modes, a codec encoder provides feature-based video compression. In another mode, the codec encoder provides conventional video compression. Similarly, a codec decoder is responsive to different video signal modes and is capable of providing feature-based video decompression, and conventional video compression depending on the contents of the video signal (e.g. the video signal mode).

The codec may determine which type of video compression is appropriate based on whether feature-based encoding or conventional based encoding provides more compression efficiency for one or more features in video frames of the video signal.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Introduction Section

A description of example embodiments of the invention follows. The teachings of all patents, published applications and references cited herein are incorporated by reference in their entirety.

Digital Processing Environment and Network

Preferably, the invention is implemented in a software or hardware environment. One such environment is shown in FIG. 3, which illustrates a computer network or similar digital processing environment in which the present invention may be implemented.

Client computer(s)/devices 350 and server computer(s) 360 provide processing, storage, and input/output devices executing application programs and the like. Client computer(s)/devices 350 can also be linked through communications network 370 to other computing devices, including other client devices/processes 350 and server computer(s) 360. Communications network 370 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 3:
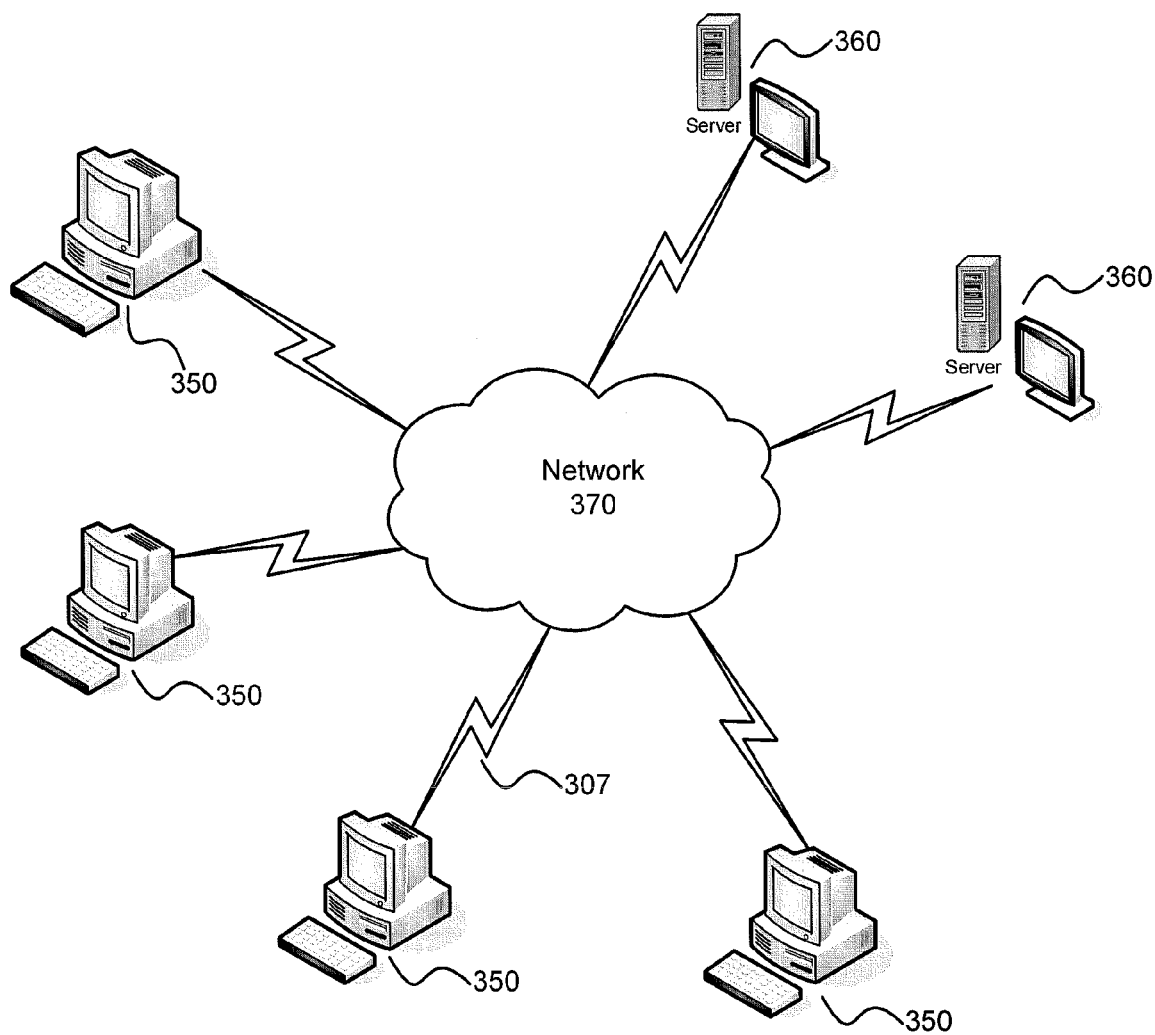
FIG. 3 is a schematic diagram of a computer network environment in which embodiments of the present invention are deployed.
Figure 4:
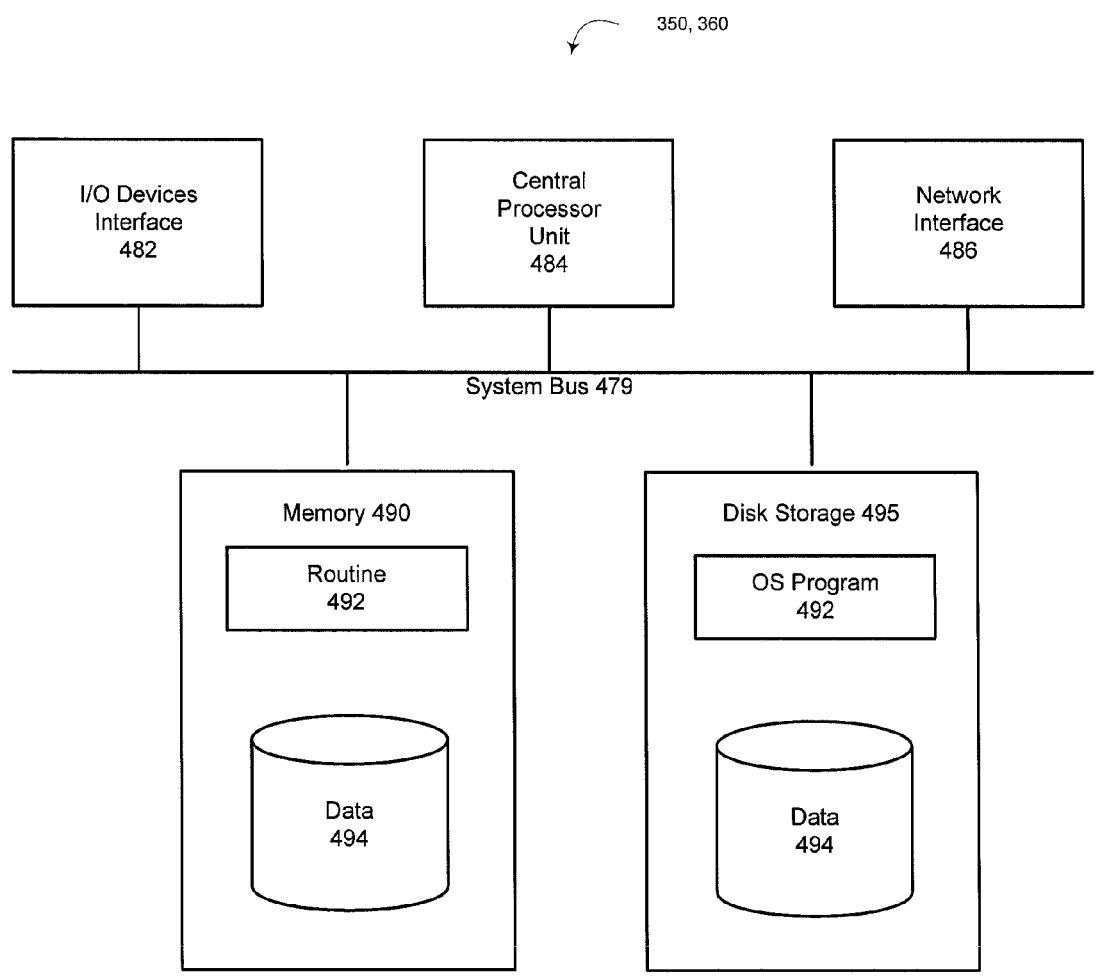
FIG. 4 is a block diagram of the computer nodes in the network of FIG. 3.

FIG. 4 is a diagram of the internal structure of a computer (e.g., client processor/device 350 or server computers 360) in the computer system of FIG. 3. Each computer 350, 360 contains a system bus 479, where a bus is a set of actual or virtual hardware lines used for data transfer among the components of a computer or processing system. Bus 479 is essentially a shared conduit that connects different elements of a computer system (e.g., processor, disk storage, memory, input/output ports, etc.) that enables the transfer of information between the elements. Attached to system bus 479 is I/O device interface 482 for connecting various input and output devices (e.g., keyboard, mouse, displays, printers, speakers, etc.) to the computer 350, 360. Network interface 486 allows the computer to connect to various other devices attached to a network (for example the network illustrated at 370 of FIG. 3). Memory 490 provides volatile storage for computer software instructions 492 and data 494 used to implement an embodiment of the present invention (e.g., hybrid codec, video encoder compression code and decoder code/program routine detailed above). Disk storage 495 provides non-volatile storage for computer software instructions 492 (equivalently "OS program") and data 494 used to implement an embodiment of the present invention. Central processor unit 484 is also attached to system bus 479 and provides for the execution of computer instructions. Note that throughout the present text, "computer software instructions" and "OS program" are equivalent.

In one embodiment, the processor routines 492 and data 494 are a computer program product (generally referenced 492), including a computer readable medium (e.g., a removable storage medium such as one or more DVD-ROM's, CD-ROM's, diskettes, tapes, etc.) that provides at least a portion of the software instructions for the invention system. Computer program product 492 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 307 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 492.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 492 is a propagation medium that the computer system 350 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Overview—Feature-Based Video Compression

Figure 1:
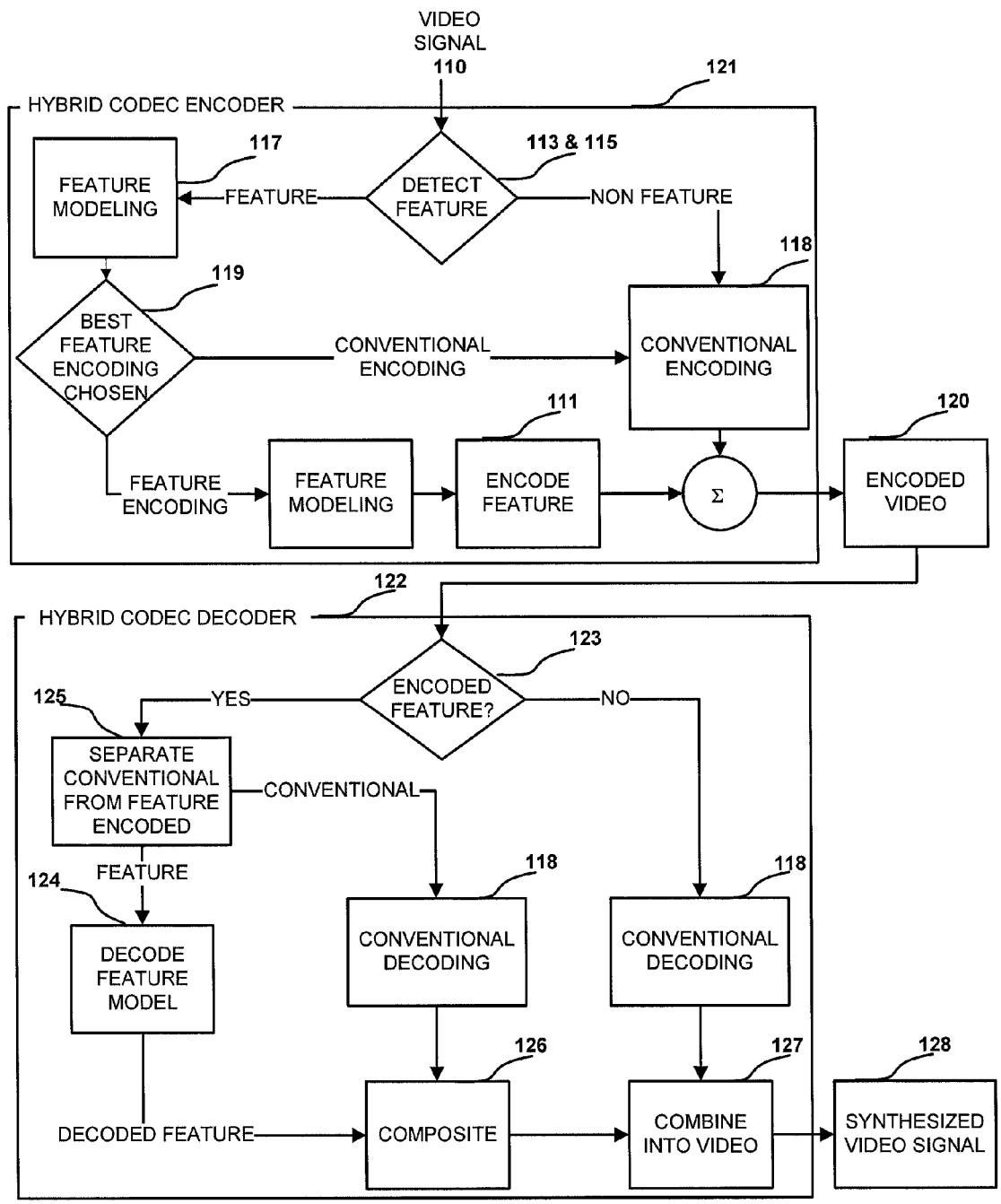
FIG. 1 is a schematic diagram of an embodiment (hybrid codec) of the present invention.

The present invention provides a hybrid (feature-based and conventional) codec method (FIG. 1) with a means of detecting 113, separating 115, modeling 117, encoding 111, and decoding 124 features in video while allowing a conventional codec 118 to encode and decode the non-features as well as the features that cannot be advantageously processed through the feature encoder/decoder. FIG. 1 illustrates that a subject video signal input (video data formed of a series of image frames) 110 is encoded by the invention hybrid codec 121. The hybrid codec contains the encoding decision heuristics and processes the video signal as follows: At step 113, the detection of features is primarily accomplished through the identification of groups of pels in close proximity that exhibit complexity. Complexity is generally defined as any metric indicating that the encoding of the pels exceeds a level that would be encoded efficiently by conventional video compression. This grouping of pels in close proximity provides segmentation of the detected feature (at 115) from the background and other features. The grouping is subsequently analyzed to determine if the complexity can be advantageously modeled using the invention's feature modeling 117.

Once features are detected and tracked and models of the features are generated (at 117), the feature modeling and conventional modeling are compared (at comparator 119) to determine which one is of greater benefit. The conventional video encoding mechanism (at 118) employing reference frame processing used in the motion compensated prediction of the current frame is utilized in this process. Because the comparison 119 has employed conventional reference frame processing, a segmentation of the current frame is yielded (based on the selection of predictions from different reference frames). The selection of pels (more typically as macroblocks) in one reference frame versus another reference frame indicates a segmentation of the features in the frame, and in the subject video 110 itself. The resulting encoding 120 of the subject video signal input 110 includes a conventional video encoding stream (output of conventional encoder 118) accompanied by the additional encoded information needed to regenerate the features in the reference frames.

The hybrid codec decoder 122 illustrates decoding the encoded video in order to synthesize (approximate) the input video signal 110. When examining the stream of information contained in the encoded video, the hybrid codec decoder makes a determination 123 on a sub-frame level, macroblock level, whether or not there is an encoded feature in the encoded video. If an encoded feature does not exist, the conventional macroblock, or non-feature macroblock, is decoded conventionally. If an encoded feature is encountered in the encoded video stream, the hybrid codec separates 125 the feature-encoded parts from the conventionally encoded parts in order to synthesize each separately, combining the parts after synthesis occurs. The hybrid codec uses the encoded feature parameters with the feature models that were created by the decoder (models made exactly and in parallel to those made in the encoder) to synthesize the feature 124. Then the conventionally encoded feature parts and the feature-encoded parts are composited 126 to produce a complete feature synthesis. Next the hybrid codec at 127 combines the feature synthesis with the non-feature synthesis to yield a fully synthesized video signal 128.

Figure 7:
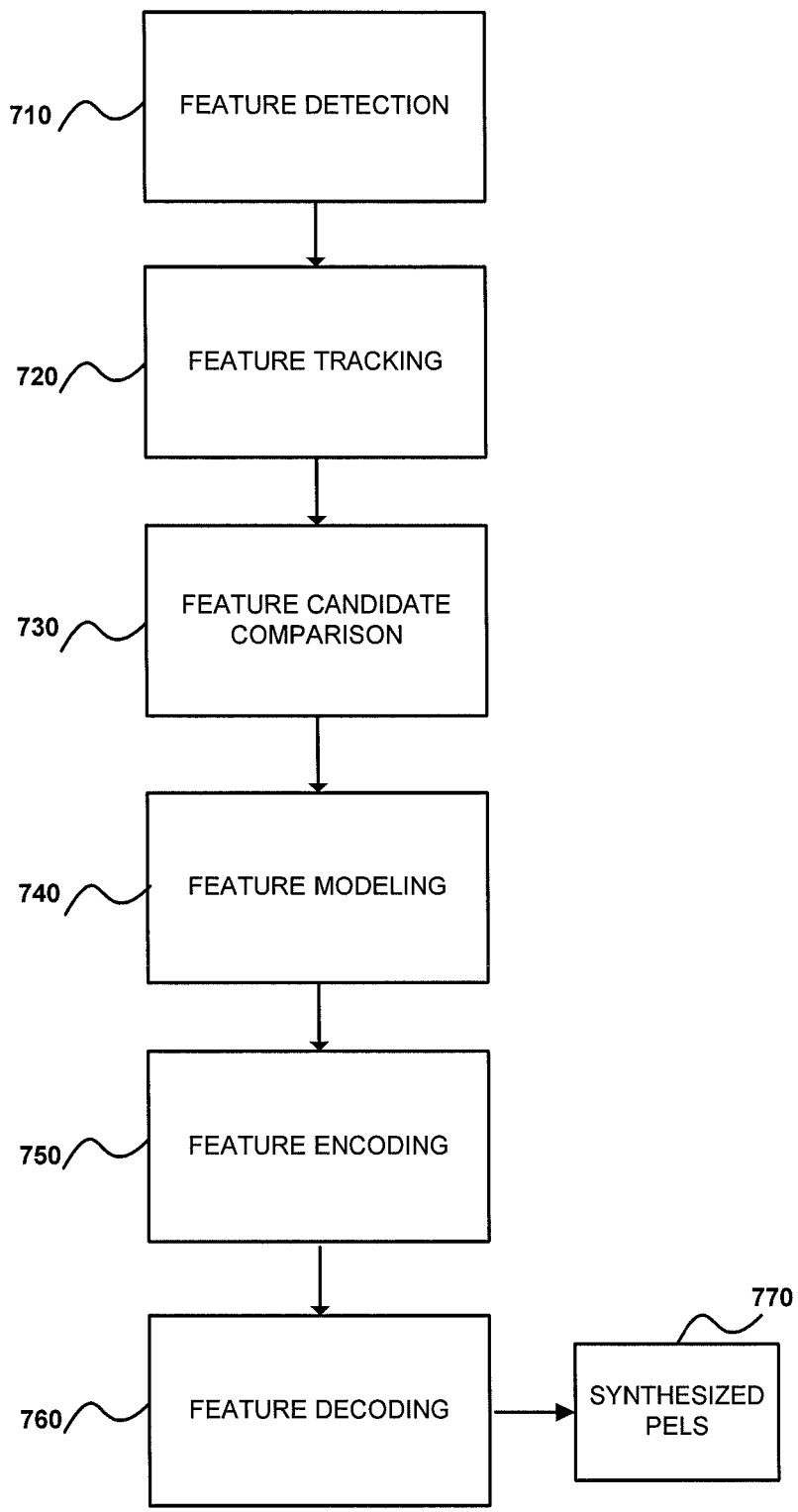
FIG. 7 is a block diagram of an embodiment (codec) of the present invention.

FIG. 7 is a representation of an embodiment of the present invention which utilizes feature-based encoding as a replacement in part, and in some cases in full, for conventional encoding. Detecting 710, tracking 720, comparing 730, modeling 740, encoding 750, and decoding 760 features in a video signal are illustrated.

At step 710, as in 113, the detection of features is primarily accomplished through the identification of spatially proximate groups of pels that exhibit complexity such that they can be encoded/modeled more efficiently than conventional means. These groups of pels effectively separate the detected feature (710) from the non-feature pels around it, as also noted in 115. The detected features, or feature instance candidates, or simply feature candidates are further analyzed to correlate the groups of pels over two or more frames. This correlation confirms that the feature instances are representative of a discrete entity in the video frames that can be tracked 720 thereby confirming additional redundancy in the video that can be potentially reduced through modeling the feature 740. Within step 720, the feature is tracked via the identification of the feature's instance (equivalently region) within the current frame along with instances of the feature in one or more other frames, also noted in 117. Note that throughout the present text "feature instance" is equivalent with "region". Also, "instance" is equivalent with "feature instance" and "region" when it references them.

The instances of each individual feature are considered candidate features, and become combined into a full fledged feature through grouping them into feature sets, or simply feature. These instances are analyzed, compared, and classified into feature sets in step 730 through the identification of correspondences between the instances.

In the present text, feature candidates and feature instances are equivalent. The feature sets are analyzed to obtain a model of the deformation variation and appearance variation of the feature instances. The deformation variation between feature instances is determined through a deformation modeling process. The deformation modeling process compares two or more instances in order to determine the spatial pel resampling that would be required to reduce the per pel differences between the instances.

Feature candidates are modeled within step 740, which applies multiple analysis techniques to refine the sampled regions. Feature encoding 750 of the video stream utilizes the feature models and encodes the video stream in part, or in full, without the use of conventional video encoding. The decoding 760 synthesizes the features using the feature models in the inverse of the modeling operations 750 to decode the encoded features into a synthesis of the pels 770 of each feature instance, approximating the feature as it appeared originally in the video.

Prediction Segmentation [Primary]

Figure 6:
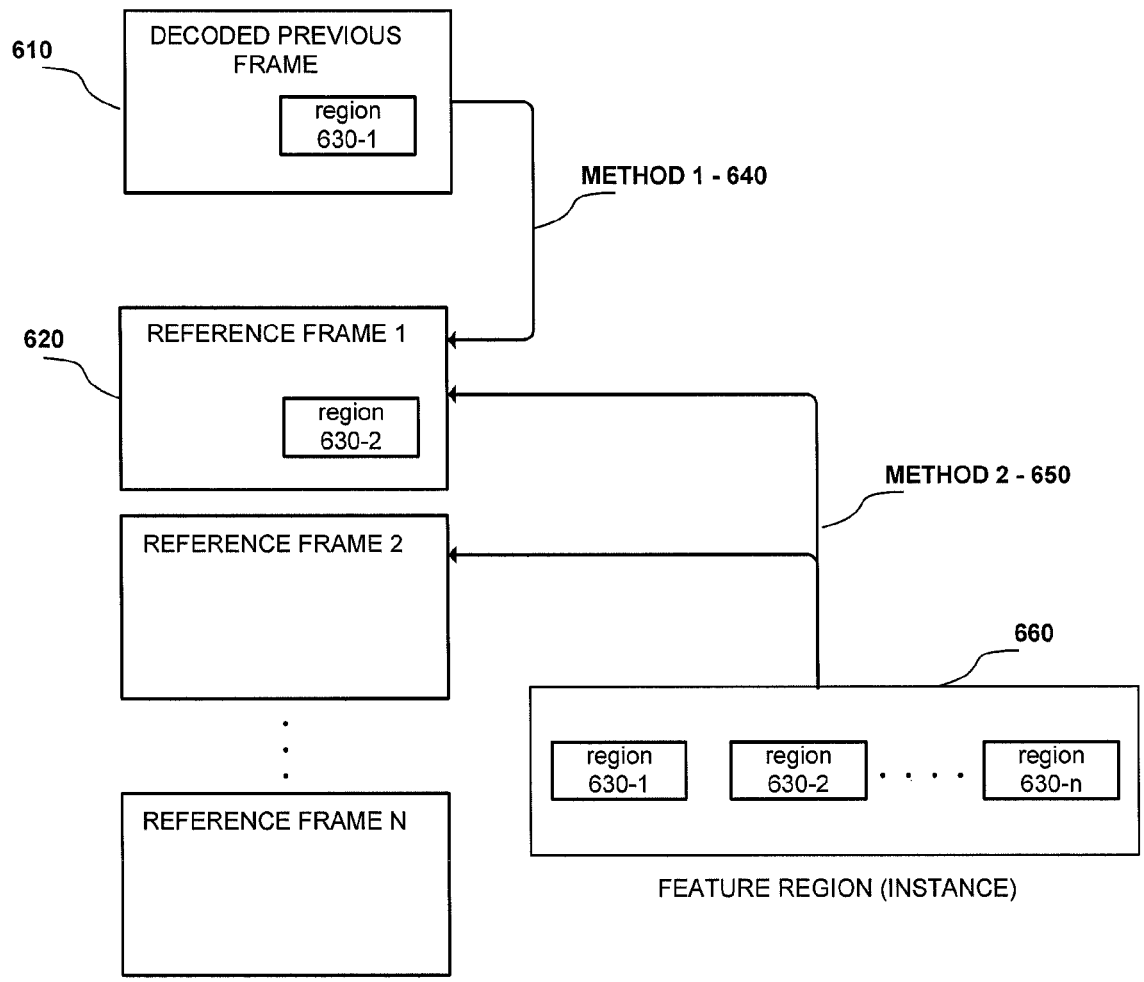
FIG. 6 is a diagram describing the prediction process according to an embodiment of the present invention.

FIG. 6 demonstrates the process of predicting elements within the current video frame by utilizing information contained within one or more past frames being placed in one or more reference frames. In one embodiment, the prediction, Method 1, 640, replicates regions from one or more prior decoded frames 610 into a reference frame 620. Method 2, 650, additionally places feature instances 660, comprised of feature regions 630-1, 630-2, . . . 630-n, into the reference frame. The insertion of the feature instance directly into the reference frame represents a simple form of the present invention, where, in one further embodiment, the segmentation is simply a rectangular region, and the model of the feature is the feature instance. Additional compression gains can be realized as further modeling techniques are applied to the identified features 660 and used within the reference frames.

Prediction Segmentation is the method by which conventional compression's motion compensated prediction method is extended to allow a more accurate prediction. Conventional compression uses the additional reference frames that are generated using the invention's feature modeling methods to increase the accuracy. When parts of these feature reference frames are utilized by the conventional compression scheme, a gain in compression is achieved when the feature encoding is smaller than the conventional encoding would have been.

In one embodiment, features are represented as a set of elements or feature instances. In one embodiment, the feature instances are realized as rectangular regions, each one providing a reference to a unique frame, a spatial position within that frame, and a rectangular extent of the region in that frame. Each instance of the feature represents a sampled image of the feature. Variation in the appearance of the feature from instance to instance is modeled by the feature modeling method.

In one embodiment, the reference frames are populated with one or more sub frame samples from previously synthesized frames. The sub-frame samples are based on feature instance correspondences between those sub-frame regions in the previously synthesized (decoded) frame and the current frame.

In a further embodiment, the multiple image planes are consolidated into fewer image planes. These fewer image planes have the feature located close to the position expected in the frame to be predicted. Frame reduction is based on consolidating non-overlapping or near-zero spatially overlapping features into the same plane.

Applicant's reduction to practice has gone further with this as well, by estimating a bounding box of the feature-based on the feature information (previous matches, tracking information, modeling information).

In another non-limiting embodiment, each consolidated frame is equal to the size of the frame being predicted and the features are spatially close to if not exactly at the position expected by the conventional motion compensated prediction mechanism.

Feature Detection

Figure 5:
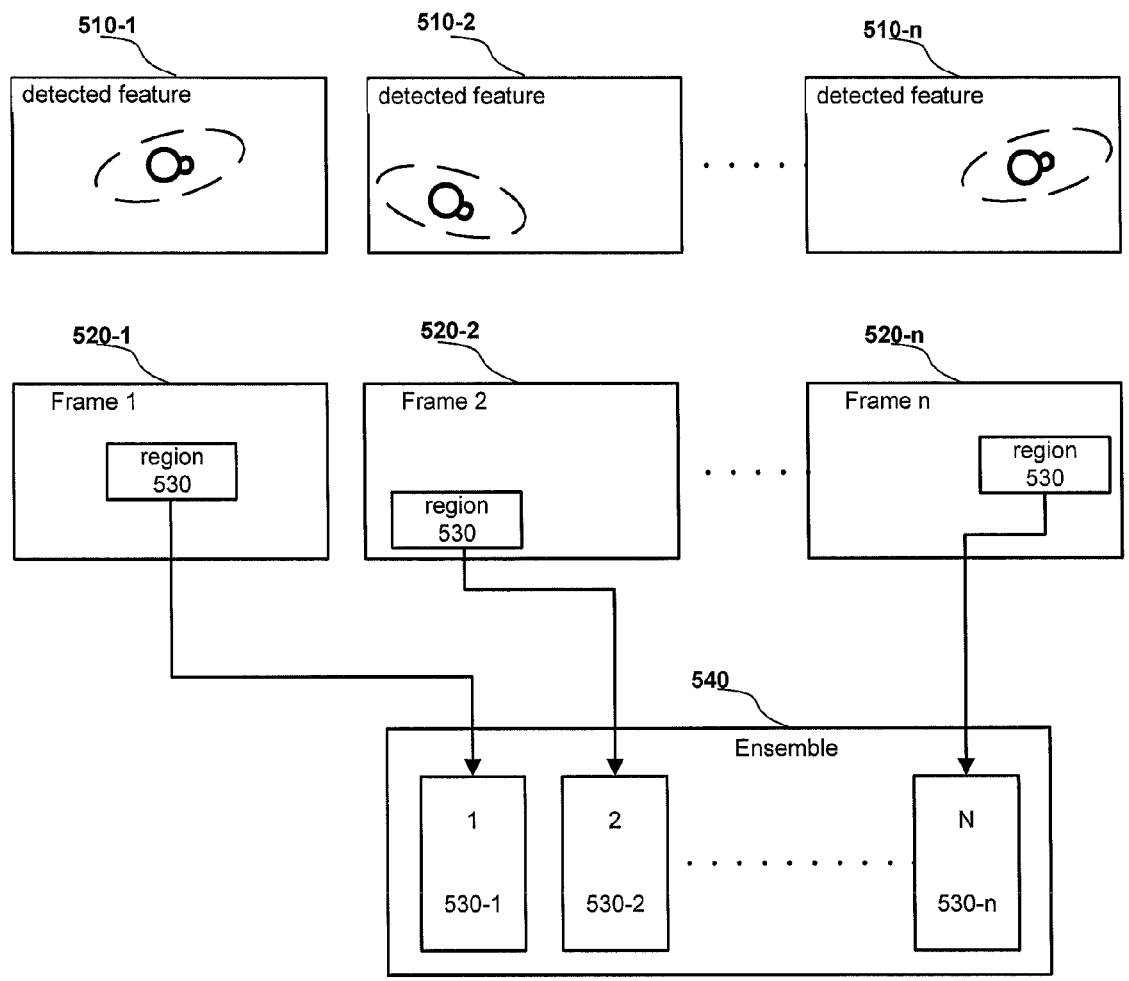
FIG. 5 is a diagram depicting feature modeling representing one embodiment of the present invention.

FIG. 5 depicts a feature, 510-1, 510-2, . . . 510-n that has been detected in one or more frames of the video 520-1, 520-2, . . . 520-n. Typically, such a feature would be detected using several different criteria based on both structural information derived from pels and complexity criteria indicating that conventional compression utilizes a disproportionate amount of resources to encode the feature. As compared with feature encoding, each feature can further be identified spatially in a frame 520-1, 520-2, ... 520-n by a corresponding spatial extent, perimeter, shown in the figure as a "region" 530-1, 530-2, ... 530-n.

These regions 530-1, 530-2, ... 530-n can be extracted, for instance as a simple rectangular region of pel data, and placed into an ensemble, 540, the whole of the ensemble representing a feature.

Each instance of a feature in a frame is a sample of the appearance of the feature. Note that when a sufficient number of these samples are coalesced into an ensemble, they can be used to model the appearance of the feature in those frames, and also in other frames from which the feature was not sampled. Such a model is able to transform the appearance into an encoded set of parameters that can further be decoded through the inverse model to create a synthesis of the feature.

Small spatial regions are identified and analyzed to determine if they can be combined based on some coherency criteria into larger spatial regions. These larger spatial regions are then analyzed to determine their suitability as candidate features. Should the region's feature modeling not provide a beneficial encoding, the candidate feature is either discarded or retained for modeling future instances of that feature with subsequent frames. The detection process proceeds until only those candidate features exhibiting an advantageous modeling remain.

Spatial regions vary in size from small groups of pels or subpels to larger areas that may correspond to actual objects or parts of those objects as tending to be implicitly segmented through the macroblocks or sub-macroblocks partitioning steps as determined by conventional video compression algorithms. However, it is important to note that the detected features may not correspond to discretely unique and separable entities such as objects and sub-objects. There is no requirement that the features correspond to such entities. A single feature may contain elements of two or more objects or no object elements at all. The critical factor is that the current invention has the potential to process these signal components with efficiency greater than conventional methods, and they sufficiently satisfy the definition of a feature purely based on their being efficiently modeled by feature-based video compression techniques.

Small spatial regions may be aggregated into larger regions in order to identify these larger regions as features. Small regions are aggregated into larger ones through the identification of coherency among them. There are several ways that coherency can be identified including coherent motion, motion compensated prediction, and encoding complexity.

Coherent motion may be discovered through higher order motion models. For example, the translational motion for each individual small region is integrated into an affine motion model which is able to approximate a simpler motion model for each of the small regions.

If the small regions motion can be integrated into more complex models on a consistent basis, this implies a dependency among the regions that may potentially provide an advantage over a conventional motion compensated prediction method, and also indicates a coherency between the small regions that could be exploited through feature modeling.

Encoding complexity can be determined through analysis of the bandwidth required by conventional compression to represent one or more of the small regions. Where there is a disproportionate allocation of bandwidth to a certain set of small regions that conventional encoding cannot efficiently compress and additionally may not be able to correlate as being redundant from frame to frame, these regions can potentially be aggregated into a feature whose encoding complexity may indicate the presence of a phenomena that feature modeling would better represent.

A set of known frames are each completely partitioned into uniform tiles arranged in a non-overlapping pattern. Each tile is analyzed as an independent sampled region of pels that is determined in practice to contain enough information to characterize the feature. The current invention uses these sampled regions to produce multiple classifications which, in turn, are used in training a classifier. Note that the final position of any feature may differ from this initial positioning.

A further embodiment generates sampled regions from the defined tiles and a tiling that overlaps those tiles. The overlapping sampling may be offset so that the center of the overlapping tiles occur at the intersection of every four underlying tile's corners. This over-complete partitioning is meant to increase the likelihood that an initial sampling position will yield a detected feature. Other, possibly more complex, topological partitioning methods are also anticipated.

A feature modeling predictor classifies sampled regions into clusters with significant probability that a region will have some correspondence to other regions in that same cluster. The feature modeling predictor uses pattern examples derived from the sampled region(s).

In a preferred embodiment, the features are detected with assistance from spectral profiling (described below in Spectral Profiling section). Spectral profiling provides regions of the frame that may be part of a single feature. This is used as a means of combining sampled regions into a feature.

In one embodiment, a pattern feature is defined as a spectral feature. The spectral feature is found by transforming the region from a color space into an HSV color space. The transformed region is then sub-sampled repeatedly down until the image vector space of the derived region is of a much smaller dimension than the original region's image vector space. These derived regions are considered the spectral features. The spectral features are clustered using a modified K-means algorithm. The K-means clusters are used to label the original regions based on their spectral classification.

In one embodiment, a classifier is built based on the edge content of the sampled regions. Each region is transformed into DCT space. The derived feature's DCT coefficients are then summed for the upper triangular matrix and the lower triangular matrix. These sums are then used to form an edge feature space. The feature space is then clustered using K-means, and the original regions are labeled according to the classification of their derived region clusters.

In yet another embodiment, the spectral feature and edge pattern feature classifier are used to generate multiple classifications for each region.

Feature Tracking

One embodiment uses a combination of newly detected and previously tracked features as the basis for determining the instances of the same corresponding feature in the current frame. The identification of this feature's instance in the current frame and the inclusion of this instance along with previously occurring instances of the region constitute the tracking of the feature.

Figure 8:
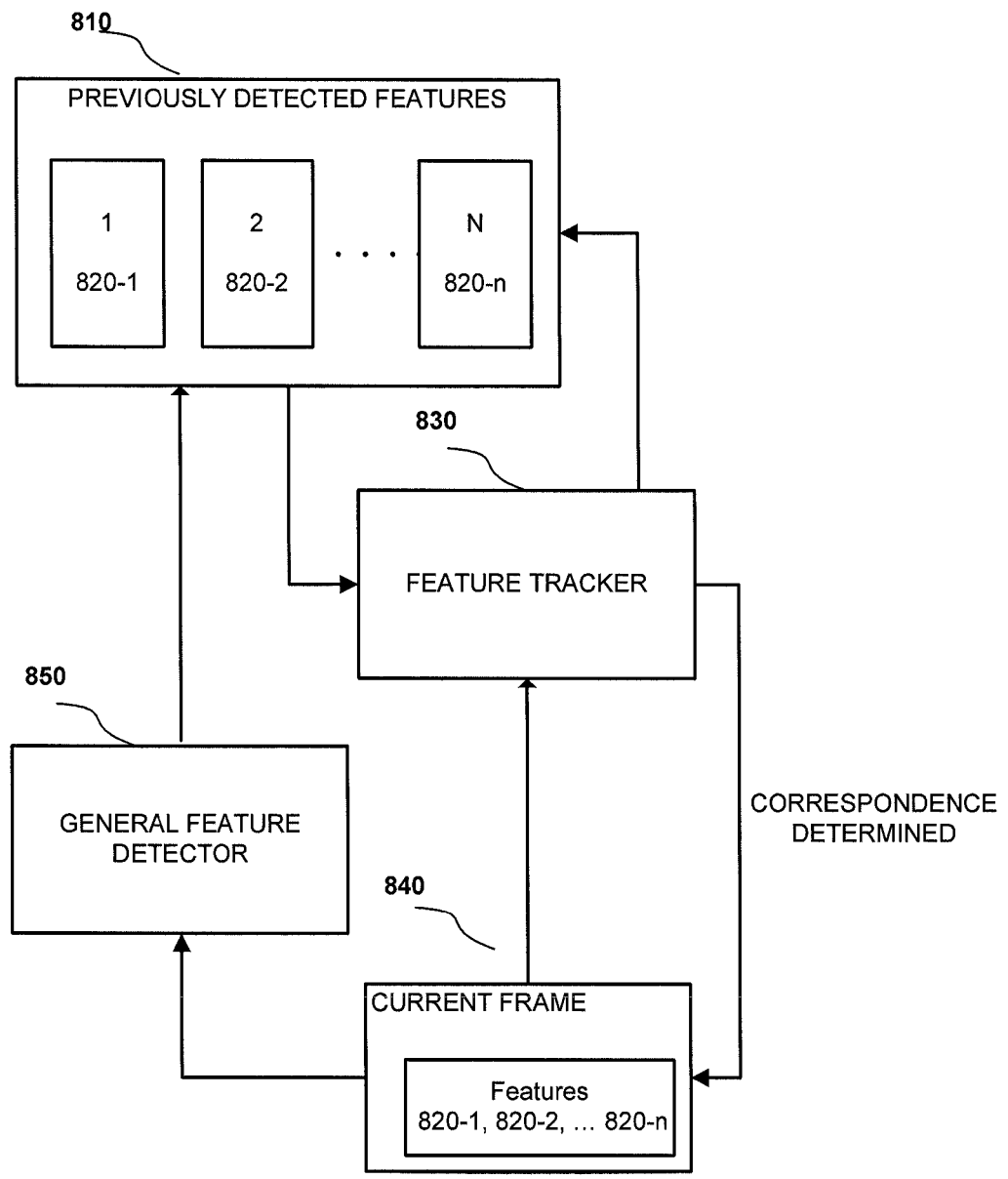
FIG. 8 is a diagram depicting feature tracking according to an embodiment of the present invention.

FIG. 8 demonstrates the use of a feature tracker 830 along with the combination of newly detected and previously tracked features 810 to track and classify features 820-1, 820-2, ... 820-n. Initially, a general feature detector 850 is used to identify features. Correspondence is determined based on the current frame 840 being matched to the previously detected features 810. The tracked features are organized into sets of features, or classified as belonging to a previously assembled feature set or to a new feature set.

Feature correspondence can initially be determined through conventional gradient descent minimizing an estimate of mean squared error. The resulting spatial displacement gives an approximate position of the feature in the current frame. The template that is used in the search need not be a single region of the feature, but can be any of the regions associated to the feature. The final match is then evaluated in a robust manner as a count of non-overlapping region tiles that meet a MSE threshold.

By imposing a spatial constraint on the coincidence of two or more regions, the tracker is able to decrease the number of features being tracked and therefore increase the computational efficiency of the tracking. The spatial coincidence of two or more features can also indicate additional feature cases, where the feature may have actually been two features in the past or some other complex feature topology. The tracker modes allow for temporary degenerate tracking states that allow the feature to be tracked, but make the tracked regions of a lower priority.

Feature Modeling

During some analysis phase, the region to be predicted is used to traverse the Region Correspondence Model (RCM) in order to determine regions within the model that would be used to construct a region prediction model.

In one embodiment, the target region is used to update the RCM thereby generating translational and mid-point normalized correspondences between other regions contained within the RCM and the target region. The resulting pair-wise region correspondences identify the other regions most likely to yield a prediction model for the target region.

The present invention includes the assembly of one or more of the best correspondences for a particular target region into a set termed an ensemble of regions. The ensemble of regions can be spatially normalized toward one key region in the ensemble. In one embodiment, the region closest to the target region temporally is selected as the key region. The deformations required to perform these normalizations are collected into a deformation ensemble, and the resulting normalized images are collected into an appearance ensemble, as described in U.S. Pat. Nos. 7,508,990, 7,457,472, 7,457,435, 7,426,285, 7,158,680, 7,424,157, and 7,436,981 and U.S. application Ser. No. 12/522,322, all by Assignee. The entire teachings of the above listed patents and application are incorporated by reference.

The appearance ensemble is processed to yield an appearance model, and the deformation ensemble is processed to yield a deformation model. The appearance and deformation models in combination become the feature model for the target region. In one embodiment, the method of model formation is a Principal Component Analysis (PCA) decomposition of the ensemble followed by a truncation of the resulting basis vectors. In a further embodiment, the criteria for truncation may be the intra-ensemble reconstruction.

In another embodiment, the method of model formation (appearance and deformation models) is Compressed Sensing (CS), described elsewhere, wherein the model parameters are resolved from partial parameter measurements.

The target region is projected onto the feature model yielding the feature parameters. They are for the deformation and appearance modeling of the region. Also, the feature parameters are the encoding of the target region.

The feature model parameters for two or more intra-ensemble regions are selected using temporal criteria. These parameters are used to predict the state of the target region given the known interval between the regions themselves and the target regions. One example of a state model is a linear extrapolation of two or more feature parameters given temporal steps. The linear model is used to predict the feature parameters for the target region.

If the extrapolated values provide a suitable synthesis (decoding) of the target region, the specification of the target region's feature parameters is not required, or they can be differentially specified relative to the extrapolated parameters.

The state model for extrapolation can be of higher order than a simple linear model. In one embodiment, an extended Kalman filter is used to estimate the feature parameter state.

Region Correspondence Model

The combination of classification, registration, and deformation analysis provides a set of information that indicates the probability that two or more regions can be combined into a joint model of appearance and deformation, called a Region Correspondence Model (RCM).

In one preferred embodiment, the feature detection method (described above) analyzes novel features incrementally. One result of this analysis is the higher probability that a region would correspond to other regions used to construct one of the feature detectors.

Once regions are classified into clusters as in the above-discussed feature detection, and given their respective cluster labels, the inter-cluster regions are analyzed to determine the per region correspondence between region pairs.

In a preferred embodiment, the classifier described above is used to define clusters of sampled regions whose region source pels are further analyzed and defined through region translational refinement (described below).

Additionally, in a preferred embodiment, subsequent to translational region refinement, region correspondences can be further defined in terms of their region deformation analysis (discussed below).

In one embodiment, the construction of the RCM is achieved incrementally. Two or more regions are used to initially seed the combined classifier/deformation analysis mechanism. The RCM is then updated with new regions that alter the classifiers and the deformation analysis elements.

In one embodiment, the incremental update of the RCM described above is constructed such that regions correspondences for a given model are processed in a traversal order dependent on base complexity analysis detailed below.

In one embodiment, the traversal order as discussed above dependent on a base complexity analysis (described below) are part of an iterative process that updates the RCM with traversal termination criteria. The termination criteria leave the processing completed to a level that maximizes the RCM's ability to represent correspondences with the greatest probability to reduce complexity when appearance/deformation models are derived from the correspondences.

Region Translational Refinement

In one embodiment, sampled regions are gathered together into a set of training sampled regions. The spatial position of these regions in each frame is refined.

A refinement includes an exhaustive comparison of each sampled region to every other sampled region. This comparison is comprised of two tile registrations. One registration is a comparison of a first region to a second region. The second registration is a comparison of the second region to the first region. Each registration is performed at the position of the regions in their respective images. The resulting registration offset along with the corresponding positional offset are retained and referred to as correlations.

The correlations are analyzed to determine if multiple registrations indicate that a sampled region's position should be refined. If the refined position in the source frame would yield a lower error match for one or more other regions, then that region position is adjusted to the refined position.

The refined position of the region in the source frame is determined through a linear interpolation of the positions of other region correspondences that temporally span the region in the source frame.

Spectral Profiling

The Spectral Profiling method is a statistical "mean tracking and fitting" method. Other examples of such methods are described in the literature are CAMSHIFT, mean shift, medoid shift, and their derived methods as applied to detection, tracking, and modeling of spatial probability distributions occurring in images and video frames. The Spectral Profiling method of the present invention starts with analyzing intensity elements, pels of the spectral (color) planes of a region of an image plane, across one or more frames. The intensity elements are processed first through a discretization of the values via a histogram binning method. Then the histogram for a region is used with a tracking mechanism to identify more corresponding regions in subsequent frames that have a similar histogram. The region's set of elements (position, discretization criteria, and histograms) is iteratively refined so it converges on a common set of these elements. The refined set of elements is the spectral profile. The spectral profile method is a feature detection method.

There is an advantage to using a one dimensional K-means classification, so the Hue channel of an HSV color-space is utilized in the formation of the classifier. Additionally, the pels are classified and histogram bins are filled, and spatial invariant moments are determined.

The core basis functions for the present invention utilize preexisting data to derive models for the new data. The preexisting data can be obtained through any encoding/decoding scheme and is assumed to be available. The invention analyzes this data to determine a set of candidate pattern data, referred to as feature data, which can include data for both the appearance and deformation of a spatially localized component of the video signal.

Given a particular set of preexisting feature data and a novel target data point, analysis is performed to determine a minimal description of the feature data required to build a model for representing the target data point. Without loss of generality, the preexisting feature data is referred to as the candidate feature vectors and the target data point is referred to as the target vector. Further, the process is applicable to one or more target vectors.

Given a target vector and a set of candidate feature vectors (all deemed to be part of the same feature), a minimal subset of the candidate feature vectors is selected to synthesize the target vector with low error, resulting in a manifold representation that is both compact and accurate.

The present invention aggregates a set of candidate feature vectors into what is termed the feature ensemble. In one embodiment, the first step in creating the feature ensemble is to select a key vector, a feature vector determined to be a good approximation of the target vector. The key vector is the first vector in the feature ensemble. Other candidate feature vectors are selected for the feature ensemble in the order of their correlation with the key vector (so the second vector in the feature ensemble is the feature vector having next-highest correlation with the key vector). Ordering a feature ensemble in this way is termed key-correlation ordered (KCO).

In another embodiment, the feature ensemble is created using the target vector itself. Candidate feature vectors are selected for the feature ensemble based on their correlation with the target vector. Any ordering method making use of target vector correlation is termed target-correlation ordered (TCO). The first feature vector in a TCO feature ensemble is the candidate feature having largest correlation with the target vector. In a preferred embodiment, every time a feature vector "enters" the ensemble, the approximate target reconstruction via the ensemble-to-date (Ur) is computed as $Ur*Ur*t$ and then subtracted from the target vector t to form a residual vector. The next feature vector for the ensemble is then selected as being the candidate feature having largest correlation with the residual vector. This iterative process of computing the residual vector and then selecting the best match to the residual is thus termed sequential target-correlation ordering (STCO). STCO ensures the most efficient representation of the target vector for a given ensemble size. It is functionally equivalent to orthogonal matching pursuit (see Prior Art) but more computationally efficient for small ensemble sizes.

In another embodiment, residual vectors are not computed and all candidate feature vectors are selected for the feature ensemble based on their correlation with the target vector itself. This TCO method, termed global target-correlation ordering (GTCO) is faster and simpler than STCO but may result in redundancies in the ensemble. However, both TCO methods are generally far superior to the KCO method for selecting the ensemble.

A bitmask is used to transmit the feature vectors that were selected for the feature ensemble.

In one embodiment, the feature vectors in the feature ensemble and the target vector itself are passed through a discrete wavelet transform (DWT) before SVD-based encoding. This makes the information in the target vector more compact and more easily represented by a small subspace of SVD vectors. The DWT is a well known method for compacting signal information over multiple scales. In a preferred embodiment, the DWT is applied with the Daubechies 9-7 bi-orthogonal wavelet. The DWT is applied to each component separately as, the feature vectors are in YUV color space. For example, length-384 YUV vectors require a length-256 DWT on the Y component and length-64 DWT's on the U and V components.

Compressed Sensing (CS)

In one embodiment of the present invention, Compressed Sensing (CS) is employed as the method of model formation (appearance and deformation models) in the Feature Modeling (described elsewhere) process.

There are three practical applications of CS algorithms of interest in the present invention: Orthogonal Matching Pursuit (OMP), L1 Minimization (L1M), and Chaining Pursuit (CP). Each of the algorithms has its own strengths and weaknesses, but the L1M is prohibitively slow for most video processing applications, so in this field, OMP and CP are the two CS algorithms of choice, and L1M is used infrequently.

The effectiveness of CS algorithms is limited in practice by computation time, memory limits, or total number of measurements. To combat these limitations and improve the performance of CS algorithms in practice, the present invention uses one or more of several possible methods. Briefly, the methods achieve benefit through: (1) reducing the number of measurements specified in the literature to attain a precise reconstruction; (2) increasing sparsity in the input data by one or more specific data reduction techniques; (3) partitioning the data to ease memory limitations; and (4) adaptively building an expectation of error into the reconstruction algorithm.

One embodiment exploits the fact that, typically, the mathematical requirements for reconstruction are stricter than necessary. It is possible to achieve "good" reconstruction of image data consistently with fewer measurements than specified in the literature. "Good" reconstruction means that to the human eye there is little difference visually compared with a "full" reconstruction. For example, applying Chaining Pursuit (CP) with half the number of measurements specified still achieves "good" reconstruction.

In another embodiment, the input data is "reduced" to make it sparser, which reduces the number of measurements required. Data reduction techniques include passing the data through a discrete wavelet transform (DWT), because data is often more sparse in the wavelet domain; physically reducing the total size of the input data by truncation, also known as down-sampling; and thresholding the data (removing all components that are less than some threshold). Of the data reduction techniques, DWT transformation is the least "invasive" and theoretically allows full recovery of the input data. The other two reduction techniques are "lossy" and do not allow full signal recovery. DWT works well with CP but not with Orthogonal Matching Pursuit (OMP) or L1 Minimization (L1M). So the ideal combination for this data reduction embodiment is Chaining Pursuit algorithm with the Discrete Wavelet Transform data reduction technique.

In another embodiment especially well-suited to parallel processing architectures, the input data is partitioned into segments, (or 2-D images into tiles) and each segment is processed separately with a smaller number of required measurements. This approach works well for both OMP and L1M which typically are impeded by a memory limitation. The size of the required measurement matrix causes the memory limitation for both OMP and L1M. One can compute the amount by which the memory matrix exceeds the memory of the system. This excess memory requirement is an "oversampling" factor. It sets a lower limit for the number of segments into which the signal is divided.

In another embodiment, the process builds some expectation of error into the reconstruction algorithm. The expected error could be due to above normal noise or inaccurate measurements. The process compensates either by relaxing the optimization constraint or by stopping the iteration prior to completion of the reconstruction process. The reconstruction is then an approximate fit to the data, but such approximate solutions may be sufficient or may be the only solutions possible when the input data is noisy or inaccurate.

Figure 2:
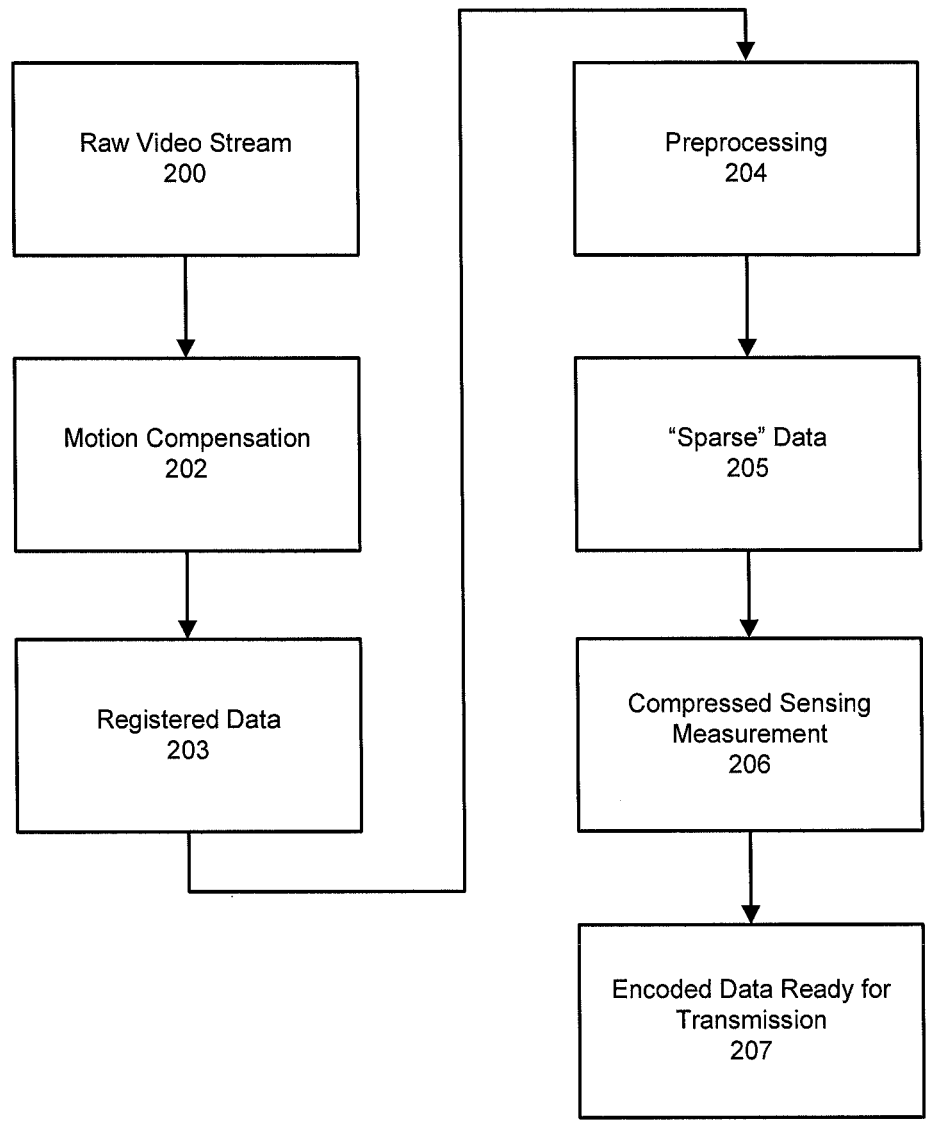
FIG. 2 is a block diagram of a video compression architecture embodied in encoders of the present invention.

FIG. 2 displays a notional video compression architecture that implements compressed sensing measurements at the encoder. The raw video stream 200 is sent through a motion compensated prediction algorithm 202 to register the data 203 thereby establishing correspondences between groups of pels in multiple frames such that the redundancies due to motion can be factored out. Then preprocessing 204 is applied to make the data as sparse as possible (at 205) so that CS measurements and the reconstruction that follow will be as effective as possible. CS measurements are taken 206 and become the CS encoding 207 (ready for transmission). Later during synthesis, the CS algorithm is used to decode the measurements.

The present invention identifies, separates, and preprocesses signal components from raw video streams into sparse signals that are well suited to CS processing. CS algorithms are naturally compatible with embodiments of the invention. It should be noted that certain aspects of FIG. 2 are related to embodiments discussed in U.S. Pat. Nos. 7,508,990, 7,457,472, 7,457,435, 7,426,285, 7,158,680, 7,424,157, and 7,436,981 and U.S. application Ser. No. 12/522,322, all by Assignee. The entire teachings of the above listed patents and patent application are incorporated herein by reference.

In the context of video compression, CS delivers a significant benefit when the input image has some sparsity, or compressibility. If the input image is dense, then CS is not the correct approach for compression or reconstruction. CS algorithms can compress and reconstruct sparse input images with fewer measurements than required by conventional compression algorithms which require a number of measurements equal to the number of pixels in the image). Note that signal sparsity or compressibility is assumed by most compression techniques, so the images for which CS provides improvement are the images for which most compression techniques are designed.

Note also that adding noise to a sparse image makes it denser mathematically but does not make it less sparse "informationally." It is still a sparse signal, and using CS with one or more of the above practical implementations can produce useful reconstructions of these kinds of signals.

Base Complexity Analysis

Representative sampled video regions can be analyzed using a base method. One such method would be conventional block-based compression, as MPEG-4.

Image Alignment Via Inverse Compositional Algorithm

Xu and Roy-Chowdhury ("Integrating Motion, Illumination, and Structure in Video Sequences . . . ," IEEE Trans. Pattern Analysis and Machine Intelligence, May 2007) extended the LRLS framework to moving objects (e.g., in video sequences), showing that such objects are well-approximated by a 15-dimensional bilinear basis of 9 illumination functions (the original LRLS basis images) and 6 motion functions that reflect the effect of motion on the LRLS basis images.

The recently proposed IC implementation by Xu and Roy-Chowdhury ("Inverse Compositional Estimation of 3D Pose and Lighting in Dynamic Scenes," IEEE Trans. Pattern Analysis and Machine Intelligence, to be published) uses the Inverse Compositional (IC) algorithm to estimate 3D motion and lighting parameters from a sequence of video frames. A 2D-to-3D-to-2D warping function is used to align (target) images from different frames with a "key" frame (template) at a canonical pose. Given a frame of image data and an underlying 3D model of the object being imaged, the 2D-to-3D map determines which 3D points (facets/vertices) in the 3D model correspond to which image pixels. Once the 2D-to-3D map has been defined, the object's pose is shifted in 3D by the previous frame's pose estimate, thereby aligning the current frame with the key frame. The shifted object in 3D is then mapped back to 2D using the 3D-to-2D (projection) map to form a "pose normalized" image frame.

Once the target frame has been registered to the template (key frame) using the 2D-to-3D-to-2D map, the resulting pose-normalized frame (PNF) is used to estimate 15 motion parameters, corresponding to 9 illumination and 6 motion variables. The illumination variables are estimated via a least-squares fit of the PNF to the LRLS (illumination) basis images. In one embodiment, the illumination component estimated by the LRLS basis images is then subtracted from the PNF, and the residual is used to estimate 6 motion parameters (3 translation and 3 rotation) via least-squares fit to the motion functions. The PNF can then be reconstructed from the 15-dimensional "bilinear" illumination/motion basis and its corresponding parameter vector.

The present invention uses aspects of the Xu/Roy-Chowdhury IC implementation to aid with image registration applications. In one embodiment, the 2D-to-3D-to-2D mapping is used as a computationally efficient substitute for mid-point normalization of feature regions. The mapping process is especially useful for features where accurate 3D models (such as the Vetter model for faces) exist. In this embodiment, the model points are specified at some pose (the "model pose") and both the key frame (the template) and the current frame (or target frame) are registered to the model pose.

Application of Incremental Singular Value Decomposition (ISVD) Algorithm

In the present invention, the SVD is reduced using a variation of the common magnitude thresholding method, termed here percentage thresholding. In one embodiment, the total energy E of the singular values in a given SVD factorization is computed as the sum of the singular values. A grouping of the singular values, referred to in the present text as a "reduced set," is created when singular values are added sequentially (in decreasing order of magnitude, largest to smallest) until the sum of the singular values in the reduced set exceeds some percentage threshold of E. This reduction method is equivalent to magnitude thresholding (see Prior Art), except the magnitude threshold does not need to be known ahead of time.

In the present invention, the singular value decomposition (SVD) is applied to feature data as follows. The M×N data matrix D consists of an ensemble of feature vectors, derived from the regions (tiles) of a given video image frame. The M×1 feature vectors are column-vectorized from 2D image tiles and are concatenated to form the columns of the data matrix D. In one embodiment, the data matrix is then factorized into its SVD and then reduced, Dr=Ur*Sr*Vr', where the reduction is via percentage thresholding. The left singular vectors are then used to encode the M×1 target vector t, the feature to be transmitted, with the final encoding given by Ur'*t. Typical dimensions might be M=384, N=20, and r=10, so that a length-384 target vector is compressed (encoded) with 10 coefficients.

Because not all feature vectors in the ensemble data matrix D are available at once, the incremental SVD (ISVD) is used to update the SVD based on the existing singular value decomposition and the data update. In one embodiment, a small number of feature vectors is grouped together to form an initial data matrix D0, for which the conventional SVD is easily computed. Then, as additional feature data vectors are added to the ensemble data matrix, the ISVD is used to update the SVD for the augmented data matrix. In a further embodiment, because new feature data vectors can sometimes be redundant with the subspace already represented in the ensemble data matrix, a linear independence test is applied to the new data vectors before they are added to the existing ensemble. Once the full set of feature data vectors has been added to the ensemble, the SVD is updated and reduced (via percentage thresholding) to provide the final SVD-based encoding.

In another embodiment, the SVD is reduced using the correlations of the left singular vectors (the columns of Ur) with the target vector t. The total correlation energy CE is computed as the sum of the correlations. A grouping of the singular values, referred to in the present text as a "reduced set," is created when correlations are added sequentially (in decreasing order of magnitude, largest to smallest) until the sum of the correlations in the reduced set exceeds some percentage threshold of CE. This method of reducing the SVD, termed target-correlation percentage thresholding, follows the same methodology as the basic SVD reduction method of percentage thresholding, except that target correlations (of left singular vectors with the target vector) are used instead of singular values for the computations.

Transform-Based Processing

The present invention performs empirical feature classification on video frame data in transform space. In one embodiment, a set of Nt features from a reference frame presented as input to the classifier. Each of the features is transformed from pel space to transform space using the linear transform of choice (possible transforms include the discrete wavelet transform [DWT] and curvelet transform [CuT]). Then, the indices corresponding to the largest P coefficients for each feature are tabulated, and the P most commonly occurring coefficients across all the coefficient lists are used to create a (P×1) classification vector (CV) for each feature (a total of Nt "reference" CVs in all). Then, each new feature vector v is classified by transforming the vector, extracting the CV indices for v, and computing a similarity measure between the CV for v and each of the reference CVs. The test feature is classified as the feature whose reference CV maximizes the similarity measure.

Information from two or more linear transforms with different strengths and weaknesses can be combined using orthogonal matching pursuit to improve the performance of the empirical transform-based feature classifier. In one embodiment, basis vectors from the DWT, which is effective at representing textures, and from the CuT, which is effective at representing edges, are combined into a dictionary D. Then, OMP is used to compute a signal representation using the functions in D for each of Nt features, as well as a representation for the "test" feature vector. The classifier then proceeds as in the basic transform-based classifier described above. Combining the information from multiple transforms in this way can improve classifier performance over that achieved by each of the individual classifiers.

Linear transforms (e.g., DWT and CuT) can also be used for compression and coding of features. In one embodiment, once a feature is transformed, the transform coefficients are ordered by magnitude and thresholded according to an energy retention criterion (e.g., enough coefficients are kept such that 99% of the feature energy is retained). Typically, many fewer transform coefficients are needed to retain 99% of signal energy than pels are needed in pel space. The transform coefficient values represent the encoding of the feature, and the compression gain is given by the percentage of transform coefficients kept relative to the number of pixels in the feature. In a further embodiment, information from multiple transforms can again be combined using OMP to improve compression gain.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method of processing video data formed of a series of video frames comprising:
   using a first video encoding process an d feature-based encoding process, processing the video frames by:
   encoding the video frames with the first video encoding process;
   processing one or more of the frames to detect one or more instances of a feature by searching the one or more frames for a region of pels having coherency and computational complexity as compared to other pels in the one or more frames;
   modeling variation of the feature instance relative to other instances of the feature to create a feature-based encoding of the feature instance, wherein modeling variation of the feature instance includes:
   identifying other instances of the feature in other frames of the video series;
   aggregating two or more of the instances of the feature into a set;
   processing the feature instances in the set to create the models for the feature based encoding;

comparing compression efficiency of the feature-based encoding of the feature instance relative to an encoding of the feature instance resulting from the first video encoding process;

determining from the comparison which encoding enables greater compression efficiency; and using the results of the comparing and determining step, applying feature-based encoding to portions of one or more of the video frames, and applying conventional encoding to other portions of the one or more video frames.

2. A computer implemented method as in claim 1 wherein the first video encoding process includes one or more of the following: an MPEG encoding process or a motion compensated prediction process.

3. A computer implemented method as in claim 2 wherein the motion compensated prediction process is used to segment the feature instance from one or more non-features in the one or more video frames.

4. A computer implemented method as in claim 1 further including using one or more frames in the series that have been previously encoded using the first encoding process to determine positional information for the feature instance, the positional information including a position and a spatial perimeter of one or more instances of the feature in the one or more previously encoded video frames.

5. A computer implemented method as in claim 1 wherein searching the one or more video frames for a region of pels having coherency further includes filtering the one or more video frames for a spatially continuous region of pels in close spatial proximity to each other.

6. A computer implemented method as in claim 5 wherein the spatially continuous region of pels in close spatial proximity to each other is capable of being tracked in one or more frames in the series.

7. A computer implemented method as in claim 5 wherein filtering the one or more video frames for a spatially continuous region of pels in close spatial proximity to each other further includes:

processing an identified region of pels to evaluate whether it is combinable with one or more other pels in close spatial proximity based on coherency criteria in order to create a larger spatial region;

encoding the larger spatial region using feature-based encoding; and comparing the feature-based encoding of the larger spatial region with an encoding of the larger spatial region resulting from the first encoding process.

8. A computer implemented method as in claim 7 wherein comparing the feature-based encoding of the larger spatial region with an encoding of the larger spatial region resulting from the first encoding process further includes:

determining which encoding provides compression efficiency; and if the feature-based encoding of the larger spatial region provides improved compression efficiency, using the larger spatial region to represent the feature instance.

9. A computer implemented method as in claim 8 wherein if the feature-based encoding of the larger spatial region does not provide improved compression efficiency relative to an encoding of the larger spatial region using the first encoding process, discarding the other pels that were used to create the larger spatial region.

10. A computer implemented method as in claim 9 wherein discarding the other pels that were used to create the larger spatial region further includes excluding from the feature instance the other pels that were used to create the larger spatial region.

11. A computer implemented method as in claim 1 wherein the coherency is based on correspondences in appearance of pels in close spatial proximity.

12. A computer implemented method as in claim 1 wherein the feature instance is predicted to provide relatively increased compactness in the feature-based encoding relative to an encoding of the feature instance resulting from the first encoding process.

13. A computer implemented method as in claim 1 wherein modeling variation of the feature instance relative to other instances of the feature results in feature-based models, which are used to create the feature-based encoding of the feature instance.

14. A computer implemented method as in claim 13 wherein the feature instance is transformed using a linear transform to create the feature-based models.

15. A computer implemented method as in claim 1 wherein modeling variation of a feature instance further includes modeling using one or more of the following modeling processes:

modeling structural variation of instances of the feature identified in the one or more video frames; or modeling appearance variation of instances of the feature identified in the one or more video frames.

16. A computer implemented method as in claim 15 wherein modeling the appearance variation further includes creating one or more appearance models using a PCA decomposition to model spatial variation between corresponding feature instances.

17. A computer implemented method as in claim 15 wherein modeling the structural variation further includes creating one or more structural models using a PCA decomposition to model spatial variation of corresponding feature instances.

18. A computer implemented method as in claim 1 wherein modeling variation of a feature instance further includes comparing feature based models of instances of the feature to identify an efficiently compressed feature-based encoding.

19. A computer implemented method as in claim 18 wherein comparing compression efficiency further includes based on the results of the comparison, using the feature-based model having greater compression efficiency.

20. A computer implemented method as in claim 1 wherein the region of pels further includes one or more macroblocks or portions of macroblocks.

21. A computer method as in claim 1 further including:

comparing one or more feature-based encodings of a feature instance to determine which feature-based encoding provides greater compression efficiency;

comparing compression efficiency of the resulting more efficiently compressed feature-based encoding with an encoding of the feature instance resulting from the first video encoding process;

determining from the comparison which encoding enables greater compression efficiency; and using the results of the comparing and determining step, applying feature-based encoding to portions of one or more of the video frames, and applying conventional video encoding to other portions of the one or more video frames.

22. A computer implemented method as in claim 1 further including using spatial positions of feature instances from the one or more video frames to predict another instance of the feature in a current frame in the series.

23. A computer implemented method as in claim 22 wherein predicting another instance of the feature in a current frame in the series further includes using parameters from models of feature instances appearing in temporally recent video frames in the series to create one or more models of the predicted feature instance in the current frame.

24. A computer implemented method as in claim 23 further including using the one or more models of feature instances appearing in temporally recent video frames to interpolate or extrapolate parameters of the predicted feature instance in the current frame.

25. A computer implemented method as in claim 23 wherein the models of feature instances appearing in temporally recent video frames in the series include one or more appearance or structural models.

26. A computer implemented method as in claim 24 further including using an extended Kalman filter to interpolate or extrapolate the parameters for the feature-based model of the predicted feature instance in the current frame.

27. A computer implemented method as in claim 24 wherein there is a reduction in computing resources required to process an encoding of the predicted feature instance in the current frame relative to an encoding of the predicted feature instance in the current frame using the first encoding process.

28. A computer implemented method as in claim 1 wherein the one or more feature instances are free of correspondence to distinct salient entities in the one or more video frames.

29. A computer implemented method as in claim 1 wherein the feature instance includes one or more objects or sub-objects.

30. A computer implemented method as in claim 1 wherein the feature instance includes at least elements of two or more salient entities, background or other parts of the video frames.

31. A computer implemented method as in claim 1 wherein the feature instance is not an object.

32. A computer implemented method as in claim 1 wherein the feature instance is identified in the one or more frames using compressed sensing.

33. A computer implemented method as in claim 1 wherein the step of comparing the compression efficiency further includes comparing the compression efficiency of two or more encoding processes.

34. A computer implemented method as in claim 33 wherein the two or more encoding processes comprises two or more of following encoding processes: the feature-based encoding process, the first video encoding process, or any other encoding process.

35. A computer system for processing video comprising:
a hybrid encoder configured to encode at least a portion of one or more video frames using a first video encoding process based on motion compensated prediction and encoding one or more other portions of the video frames using another video encoding process based on feature-based compression, the encoder configured to:
identify in a plurality of video frames instances of a feature, where the feature is a spatially continuous region of pels that are in close spatial proximity to each other having coherency and exhibiting complexity;
determine that an encoding of the feature instances using models from a feature-based encoding process provides greater compression efficiency relative to an encoding of the features instances resulting from the first video encoding process;
using the results of the and determining step, applying feature-based encoding to portions of one or more of the video frames, and applying conventional encoding to other portions of the one or more video frames;
wherein applying the feature based encoding to one or more of the feature instances by modeling their variation in the plurality of the video frames, wherein modeling variation of the feature instance includes:
identifying other instances of the feature in other frames of the video series;
aggregating two or more of the instances of the feature into a set;
processing the feature instances in the set to create the models for the feature based encoding.

36. A computer system as in claim 35 wherein the first video encoding process is an MPEG encoding process.

37. A computer system as in claim 35 wherein the motion compensated prediction process is used to segment the feature instance from one or more non-features in the one or more video frames.

38. A computer system as in claim 35 wherein the hybrid encoder is configured to use one or more frames in the series that have been previously encoded using the first encoding process to determine positional information for the feature instance, the positional information including a position and a spatial perimeter of one or more instances of the feature in the one or more previously encoded video frames.

39. A computer system as in claim 35 wherein identifying in a plurality of video frames instances of a feature further includes searching the one or more video frames for a region of pels having coherency by filtering the one or more video frames for a spatially continuous region of pels in close spatial proximity to each other.

40. A computer system as in claim 35 wherein the spatially continuous region of pels in close spatial proximity to each other is capable of being tracked in one or more frames in the series.

41. A computer system as in claim 39 wherein filtering the one or more video frames for a spatially continuous region of pels in close spatial proximity to each other further includes:
processing an identified region of pels to evaluate whether it is combinable with one or more other pels in close spatial proximity based on coherency criteria in order to create a larger spatial region;
encoding the larger spatial region using feature-based encoding; and
comparing the feature-based encoding of the larger spatial region with an encoding of the larger spatial region resulting from the first encoding process.

42. A computer implemented method as in claim 40 wherein comparing the feature-based encoding of the larger spatial region with an encoding of the larger spatial region resulting from the first encoding process further includes:
determining which encoding provides improved compression efficiency; and
if the feature-based encoding of the larger spatial region provides improved compression efficiency, using the larger spatial region to represent the feature instance.

43. A non-transitory computer readable medium storing instructions so as when executed to cause one or more computer processors to encode video frames by:
processing the video frames with a first video encoding process that uses motion compensated prediction;
searching or more of the frames for an instance of a feature that includes a spatially continuous region of pels in close spatial proximity to each other having coherency and exhibiting complexity;
identifying other instances of the feature in other frames of the video series;
aggregating two or more of the instances of the feature into a set;

processing the feature instances in the set to create the models for the feature based encoding;
comparing compression efficiency of a feature based encoding of the feature instance relative to an encoding of the feature instance resulting from the first encoding process; and
determining from the comparison which encoding enables greater compression efficiency; and
using the results of the comparing and determining step, applying feature-based encoding to portions of one or more of the video frames, and applying conventional encoding to other portions of the one or more video frames.

44. A computer implemented method for processing video data comprising:
processing portions of encoded video frames including one or more encoded features, the one or more encoded features including portions of features encoded using a feature-based encoding process and portions of features encoded using a motion compensated encoding process;
separating encoded features from non-feature portions of the video frames;
separating the portions of features encoded using feature-based encoding from portions of features encoded using a motion compensated encoding process;
decoding the non-feature portions of the video and the portions of features encoded using a motion compensated encoding process using a motion compensated decoding process;
decoding the portions of features encoded using feature-based encoding using encoded feature parameters and feature models generated by the decoder; and
compositing the decoded non-feature portions, the decoded motion compensated encoded feature portions and the decoded feature-based encoded feature portions to generate a decoded video signal;
wherein generating feature models by the decoder includes:
filtering on or more of the decoded frames to detect an instance of a feature that is a spatially continuous region of pels that are in close spatial proximity to each other, the regions of pels having coherency and exhibiting complexity; and
identifying other instances of the feature in other decoded frames of the video series;
aggregating two or more of the instances of the feature into a set;
processing the feature instances in the set to create the models for the feature based decoding.

45. A computer system for processing video comprising:
a hybrid decoder configured to decode portions of the video frames including one or more encoded features using a first video encoding process based on motion compensated prediction and to decode other portions of the video frames using another video decoding process based on feature based compression by:
separating encoded features from non-feature portions of the video frames;
separating the portions of features encoded using feature-based encoding from portions of features encoded using the first encoding process;
decoding the non-feature portions of the video and the portions of features encoded using the first encoding process using a motion compensated decoding process;
decoding the portions of features encoded using feature-based encoding using encoded feature parameters and feature models generated by the decoder; and
compositing the decoded non-feature portions, the decoded first encoding process encoded feature portions and the decoded feature-based encoded feature portions to generate a decoded video signal;
wherein generating feature models by the decoder includes:
identifying in a plurality of decoded video frames instances of a feature where the feature is a spatially continuous region of pels that are in close spatial proximity to each other having coherency and exhibiting complexity; and
identifying other instances of the feature in other decoded frames of the video series;
aggregating two or more of the instances of the feature into a set;
processing the feature instances in the set to create the models for the feature based decoding.

46. A non-transitory computer readable medium storing instructions so as when executed to cause one or more computer processors to decode video frames by:
processing the encoded video frames including one or more encoded features, with a first video decoding process based on motion compensated prediction and to decode other portions of the video frames using another video decoding process based on feature based compression by;
separating encoded features from non-feature portions of the video frames;
separating the portions of features encoded using feature-based encoding from portions of features encoded using a motion compensated encoding process;
decoding the non-feature portions of the video and the portions of features encoded using a motion compensated encoding process using a motion compensated decoding process;
decoding the portions of features encoded using feature-based encoding using encoded feature parameters and feature models generated by the decoder; and
compositing the decoded non-feature portions, the decoded motion compensated encoded feature portions and the decoded feature-based encoded feature portions to generate a decoded video signal;
wherein generating feature models by the decoder includes:
identifying, in one or more of the decoded frames, an instance of a feature that is a spatially continuous region of pels in close spatial proximity to each other having coherency and exhibiting complexity; and
identifying other instances of the feature in other decoded frames of the video series;
aggregating two or more of the instances of the feature into a set;
processing the feature instances in the set to create the models for the feature based decoding.

* * * * *

UNITED STATES PATENT AND TRADEMARK OFFICE
CERTIFICATE OF CORRECTION

PATENT NO. : 8,964,835 B2  Page 1 of 1
APPLICATION NO. : 13/341482
DATED : February 24, 2015
INVENTOR(S) : Charles P. Pace It is certified that error appears in the above-identified patent and that said Letters Patent is hereby corrected as shown below:

ON THE TITLE PAGE:

Page 2, (63) Related U.S. Application Data, after 8,908,766, please insert --filed as PCT/US2008/00090 on January 4, 2008 and--

IN THE CLAIMS:

Column 24, Claim 1, Line 49 please delete "an d" and insert --and--

Signed and Sealed this
Seventh Day of July, 2015

Michelle K. Lee
*Director of the United States Patent and Trademark Office*